United States Patent [19]

Nakano

[11] Patent Number: 5,774,737
[45] Date of Patent: Jun. 30, 1998

[54] VARIABLE WORD LENGTH VERY LONG INSTRUCTION WORD INSTRUCTION PROCESSOR WITH WORD LENGTH REGISTER OR INSTRUCTION NUMBER REGISTER

[75] Inventor: Hiraku Nakano, Kyoto, Japan

[73] Assignee: Matsushita Electric Industrial Co., Ltd., Osaka, Japan

[21] Appl. No.: 745,336

[22] Filed: Oct. 10, 1996

[30] Foreign Application Priority Data

Oct. 13, 1995 [JP] Japan .................................. 7-265151

[51] Int. Cl.[6] .................................................. G06F 7/00
[52] U.S. Cl. .................... 395/800.24; 395/386; 395/379; 395/388; 395/567
[58] Field of Search .............................. 395/800.24, 386, 395/379, 388, 567

[56] References Cited

U.S. PATENT DOCUMENTS

| 5,530,817 | 6/1996 | Masubuchi .................. 395/800.24 |
| 5,600,810 | 2/1997 | Ohkami ...................... 395/567 |
| 5,634,025 | 5/1997 | Breternitz, Jr. .................. 395/383 |
| 5,649,135 | 7/1997 | Pechanek et al. .................. 395/376 |
| 5,664,135 | 9/1997 | Schlansker et al. .................. 395/383 |

OTHER PUBLICATIONS

De Gloria et al. (A Programmable Instruction Format Extension to VLIW Architectures), pp. 35–40, 1992.
Microprocessor Report, "Philips Hopes to Displace DSPs with VLIW", B. Case, pp. 12–15, Dec. 5, 1994.

*Primary Examiner*—William M. Treat
*Assistant Examiner*—Gautam R. Patel
*Attorney, Agent, or Firm*—McDermott, Will & Emery

[57] ABSTRACT

In a variable word length VLIW-instruction processor, a VLIW-instruction word length register is provided. A VLIW-instruction contains an indication as to VLIW-instruction word length such as a VLIW-instruction word length rewrite instruction. Based on this instruction, the VLIW-instruction word length of the VLIW-instruction word length register is rewritten. For the case of normal instructions (object programs) without any indication of the VLIW-instruction word length, a VLIW-instruction word length that is stored in the VLIW-instruction word length register is initialized to a predetermined value by, for example, the loading of an initial program performed at the time of power-on. This initialized instruction word length is used as a fixed value and an object program for a conventional processor is executed. Accordingly, even when the number of instructions that are simultaneously executed is set low, "NOP (non-execution)" is lessened and the effective use of instruction memory becomes possible. In addition, it becomes also possible to run object programs for conventional processors.

49 Claims, 16 Drawing Sheets

FIG. 3

| VLIW-INSTRUCTION | NUMBER OF INSTRUCTIONS | Instructions |
|---|---|---|
| VLIW-INSTRUCTION 1 | NUMBER OF INSTRUCTIONS 2 | INSTRUCTION 11, INSTRUCTION 12 |
| VLIW-INSTRUCTION 2 | NUMBER OF INSTRUCTIONS 2 | INSTRUCTION 21, INSTRUCTION 22 |
| VLIW-INSTRUCTION 3 | NUMBER OF INSTRUCTIONS 2 | INSTRUCTION 31, INSTRUCTION 32 |
| VLIW-INSTRUCTION 4 | NUMBER OF INSTRUCTIONS L $= N \times m + \delta$ | INSTRUCTION 41, INSTRUCTION 42, ... INSTRUCTION 4 (N*m), INSTRUCTION 4 (N*m+1), ... INSTRUCTION 4 (N*m+$\delta$) |
| VLIW-INSTRUCTION 5 | NUMBER OF INSTRUCTIONS L $= N \times m + \delta$ | INSTRUCTION 51, INSTRUCTION 52, ... INSTRUCTION 5 (N*m), INSTRUCTION 5 (N*m+1), ... INSTRUCTION 5 (N*m+$\delta$) |
| VLIW-INSTRUCTION 6 | NUMBER OF INSTRUCTIONS L $= N \times m + \delta$ | INSTRUCTION 61, INSTRUCTION 62, ... INSTRUCTION 6 (N*m), INSTRUCTION 6 (N*m+1), ... INSTRUCTION 6 (N*m+$\delta$) |
| VLIW-INSTRUCTION 7 | NUMBER OF INSTRUCTIONS L $= N \times m + \delta$ | INSTRUCTION 71, INSTRUCTION 72, ... INSTRUCTION 7 (N*m), INSTRUCTION 7 (N*m+1), ... INSTRUCTION 7 (N*m+$\delta$) |
| VLIW-INSTRUCTION 8 | NUMBER OF INSTRUCTIONS L $= N \times m + \delta$ | INSTRUCTION 81, INSTRUCTION 82, ... INSTRUCTION 8 (N*m), INSTRUCTION 8 (N*m+1), ... INSTRUCTION 8 (N*m+$\delta$) |
| VLIW-INSTRUCTION 9 | NUMBER OF INSTRUCTIONS 2 | INSTRUCTION 91, INSTRUCTION 92 |
| VLIW-INSTRUCTION 10 | NUMBER OF INSTRUCTIONS 2 | INSTRUCTION 101, INSTRUCTION 102 |

VARIABLE WORD LENGTH VERY LONG INSTRUCTION WORD INSTRUCTION PROCESSOR WITH WORD LENGTH REGISTER OR INSTRUCTION NUMBER REGISTER

BACKGROUND OF THE INVENTION

1. Technical Field

This invention relates to improvements in the variable word length VLIW-instruction processor.

2. Technical Background

There is a technique known in the art as a parallel instruction execution method. In this method, two or more instructions are simultaneously executed by means of parallel processing in order to improve the performance of processors.

An example of the parallel instruction execution method is shown in U.S. Pat. No. 4,833,599. More specifically, a processor is shown which simultaneously executes a plurality of instructions in parallel by making utilization of VLIWs (very long instruction words). In this processor, although the number of instructions that a single VLIW-instruction can contain is 20 or more, the VLIW-instruction word length is fixed.

Because of the fact that the VLIW-instruction word length is fixed in such a prior art processor, there are produced the following advantage and disadvantage. The advantage is that when a great number of instructions close to the maximum number of parallel-executable instructions are executed, the processor achieves high level of performance. On the other hand, when the number of instructions that are executed in parallel is small, the frequency that instruction indicating information contained in a VLIW-instruction becomes "NOP (non-operation)" increases. Although such an indication of "NOP" is an instruction, it considerably wastes instruction memory.

U.S. Pat. No. 5,241,636 discloses a processor. This processor has two execution modes, one in which a single instruction is executed and the other in which two instructions are simultaneously executed in parallel. In this US patent, switching between these two execution modes is designated by a field contained in the instruction.

A VLIW-instruction processor, which makes utilization of such a field, is reported in "MICROPROCESSOR REPORT," Dec. 5, 1994, pp. 12–15. A field indicative of the number of instructions is placed in a VLIW-instruction and the VLIW-instruction word length is made variable.

The above-noted processor achieves effective use of instruction memory and simultaneous execution of a great number of instructions. However, it is necessary to provide a field indicative of an instruction number (the number of instructions) in a VLIW-instruction and an instruction format of the type different from a commonly-used instruction format for conventional processors, is used. As a result, it becomes difficult to run an object program prepared and compiled for use by conventional processors, and it is hard to maintain object program comparability with conventional processors.

SUMMARY OF THE INVENTION

Bearing in mind the above-described problem with the prior art techniques, the present invention was made. Accordingly, it is an object of the present invention to provide an improved VLIW-instruction processor so that instruction memories can be used effectively, a great number of instructions can be executed at the same time and object programs for conventional processors can be run.

It is another object of the present invention to provide an improved VLIW-instruction processor capable of executing VLIW-instructions without fail, even in such a case where respective VLIW-instruction processors of different models are different from one another in the maximum number of simultaneously executing instructions in parallel or in such a case where the number of instructions contained in a VLIW instruction exceeds the maximum number of instructions that a processor can simultaneously execute in parallel.

In order to achieve the above-noted objects, a VLIW-instruction word length register or an instruction number register for storing information indicative of the number of instructions contained in a VLIW-instruction is provided. In accordance with the present invention, the number of instructions contained in a VLIW-instruction is divided by the number of execution units (that is, the greatest number of instructions that the processor can execute in parallel), to find a quotient m and a reminder δ. After instruction execution is executed an equal number of times to the quotient m, instructions the number of which is equal to the reminder δ are executed.

The present invention discloses an improved variable word length VLIW (very long instruction word)-instruction processor. This processor comprises:

(a) a plurality of execution units, each of which executing an instruction;

(b) a VLIW-instruction word length register for storing a VLIW-instruction word length; and (c) an instruction control unit;

the instruction control unit receiving a VLIW-instruction with an indication indicative of a VLIW-instruction word length;

the instruction control unit rewriting, based on the VLIW-instruction word length indicated by the received VLIW-instruction, the VLIW-instruction word length stored in the VLIW-instruction word length register;

the instruction control unit controlling, based on the rewritten VLIW-instruction word length stored in the VLIW-instruction word length register, the parallel execution of instructions performed by all or some of the plurality of execution units.

In the variable word length VLIW-instruction processor, the VLIW-instruction word length-containing VLIW-instruction is formed of a plurality of instructions and one of the instructions is a word length rewrite instruction for VLIW-instruction word length rewriting.

The present invention provides an improved a variable word length VLIW-instruction processor. This processor comprises:

(a) a plurality of execution units for executing instructions;

(b) an instruction number register for storing the number of instructions contained in a VLIW-instruction;

(c) an instruction control unit;

the instruction control unit receiving a VLIW-instruction with an indication indicative of the number of instructions;

the instruction control unit rewriting, based on the instruction number indication, the instruction number stored in the instruction number register;

the instruction control unit controlling, based on the rewritten instruction number, the parallel execution of instructions performed by all or some of the plurality of execution unit.

In the foregoing processor, the instruction number indication-containing VLIW-instruction is formed of a plurality of instructions and wherein one of the instructions is an instruction number rewrite instruction for instruction number rewriting.

The present invention provides an improved variable word length VLIW-instruction processor. This VLIW-instruction processor comprises a plurality of execution units for executing instructions and an instruction control unit for controlling instruction execution performed by each of the execution units, the instruction control unit including:
(a) division means for performing a division operation of the number of instructions contained in a VLIW-instruction as a dividend and the number of the execution units as a divisor, to find a quotient and a reminder;
(b) instruction control means;
when the quotient is not zero, the instruction control means controlling the execution units to simultaneously execute, in parallel, instructions the number of which is equal to the number of the execution units, an equal number of times to the quotient;
when the remainder is not zero, the instruction control means controlling some of the execution units, the number of which is equal to the remainder, to simultaneously perform instruction execution in parallel;
when the quotient is zero, the instruction control means controlling some of the execution units, the number of which is equal to the remainder, to simultaneously perform instruction execution in parallel;
wherein, as a result of such arrangement, a plurality of instructions forming a single VLIW-instruction are divided into a plurality of instruction sets for performing instruction execution in parallel by the instruction set.

In the present invention, either based on the VLIW-instruction word length indication contained in a VLIW-instruction or based on the instruction number indication contained in a VLIW-instruction (for example, on the basis of an instruction word length rewrite instruction or an instruction number rewrite instruction), a VLIW-instruction word length that is stored in the VLIW-instruction word length register or an instruction number that is stored in the instruction number register is rewritten and updated. Accordingly, either when the word length of VLIW-instructions is short or when the number of instructions that are updated is small, "NOP" indication is lessened or becomes non-existent, whereby effective use of instruction memory can be accomplished. On the other hand, for the case of normal instructions (object programs) without the provision of fields indicative of the VLIW-instruction word length, a VLIW-instruction word length or an instruction number indicative of the number of instructions is initialized to an instruction word length corresponding to each model. Thereafter, such an initialized instruction word length is used as a fixed value and the object programs are executed. A VLIW-instruction is formed of a plurality of instructions. However, a VLIW-instruction, which is added start data and termination data at its head and end, respectively, may be used.

Additionally, for the case of providing an instruction number register for storing an instruction number indicative of the number of instructions contained in a VLIW-instruction, the above may be applicable. In other words, if all bit-lengths necessary for specifying each of a plurality of instructions held in a VLIW-instruction are the same, then a one-to-one correspondence exists between the VLIW-instruction word length and the number of instructions (the instruction number). For example, when the word length of a VLIW-instruction is 64 bytes long, the number of instructions contained in the VLIW-instruction can be calculated at 16 if the bit length of one instruction is 4 bytes long. Accordingly, as in the above case, both VLIW-instructions with an instruction number indicating field and object programs for commonly-used processors can be run.

The present invention is further characterized as follows. In this invention, a quotient m and a reminder δ of the division operation are used. If m=0, then L instructions (L=δ) are executed in parallel. If m is not zero, then instructions the number of which is equal to the number of execution units provided in the processor are executed in parallel an equal number of times to the quotient m. If δ is not zero, then the number of instructions equal to the remainder δ is executed. As a result of such arrangements, even when there exists a difference in the maximum number of parallel-executable instructions between VLIW-instruction processors or even when the number of instructions contained in a VLIW-instruction exceeds the maximum number of instructions that a VLIW-instruction processor is able to execute in parallel, it is possible to execute VLIW-instructions by setting the quotient m below the maximum number of instructions executable in parallel.

The above-described objects and other aspects of the present invention will be better understood by the following description and the accompanying drawing figures.

BRIEF DESCRIPTION OF THE DRAWINGS

Preferred embodiments of the present invention are described with reference to the drawings in which:

FIG. 3 shows an example program that is run in the VLIW-instruction processor;

DETAILED DESCRIPTION OF THE INVENTION

Preferred embodiments of the present invention are described with reference to the accompanying drawing figures.

In the present invention, the terms of "instruction" and "VLIW-instruction" are defined as follows. It is to be noted that these definitions are likewise applied to the previously-made description. "Instruction" means a task assigned to one of a plurality of execution units constituting a processor. "VLIW-instruction" means a single instruction or a set of instructions recognized by a compiler as logically being executed by a processor at the same time.

FIRST EMBODIMENT

Figure 1:
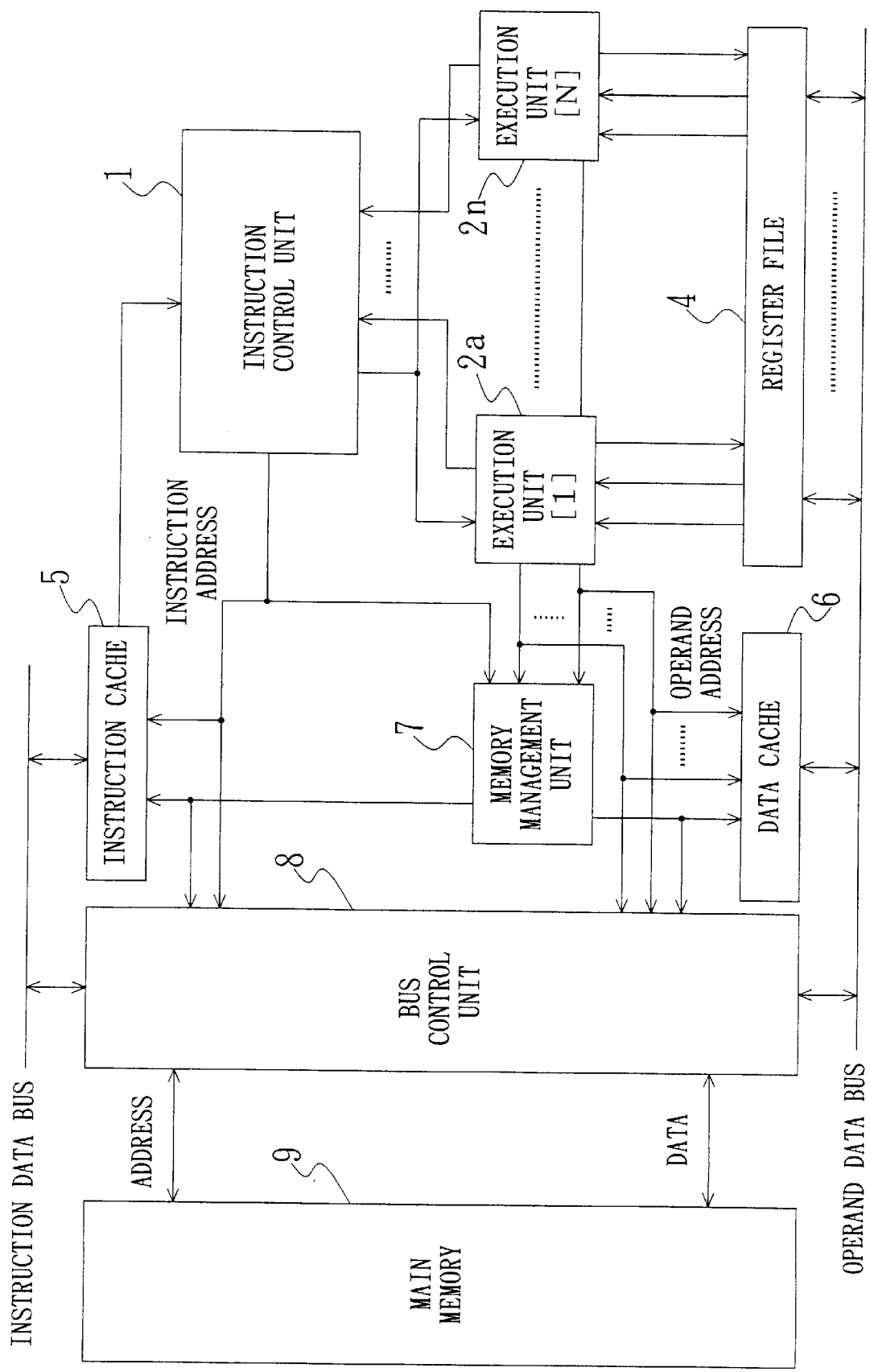
FIG. 1 depicts in block form a variable word length VLIW-instruction processor in accordance with a first embodiment of the present invention.

FIG. 1 shows the entire configuration of a variable word length VLIW-instruction processor in accordance with the present invention.

1 is an instruction control unit. 2a–2n are execution units. 4 is a register file. 5 is an instruction cache. 6 is a data cache. 7 is a memory management unit. 8 is a bus control unit. 9 is a main memory.

The instruction control unit 1 reads an instruction out of the instruction cache 5 and decodes the instruction. Thereafter, the instruction control unit 1 issues an instruction directing the execution units 2a–2n to commence instruction execution while controlling the instruction execution.

In response to such an instruction start indication from the instruction control unit 1, the execution units 2a–2n begin instruction execution, read from the register file 4 necessary operands and write results of the instruction execution into the register file 4. Additionally, when the execution units 2a–2n execute operand load instructions to the register file 4 or operand store instructions from the register file 4, the execution units 2a–2n provide either load requests or store requests and operand addresses to the memory management unit 7. In addition, each execution unit 2a–2n, when it executes a branch instruction, provides either one of information notifying that a branch is formed and information notifying that no branch is formed, and a branch address to the instruction control unit 1.

The memory management unit 7 makes a judgement of whether an instruction, which corresponds to an address of the fetching of an instruction requested by the instruction control unit 1, exists in the instruction cache 5. If the result shows the non-existence of such an instruction in the instruction cache 5, the memory management unit 7 issues a request to the bus control unit 8 so that the instruction in question is fetched from the main memory 9.

Additionally, the memory management unit 7 makes a judgement of whether data, which corresponds to an address that requests the loading of operands from the execution units 2a–2n to the register file 4, exists in the data cache 6. If the result shows the non-existence of such data in the data cache 6, the memory management unit 7 issues a request to the bus control unit 8 so that the data in question is fetched from the main memory 9.

Further, the memory management unit 7 makes a judgement of whether data to be rewritten, which corresponds to an address that requests the storing of operands from the execution units 2a–2n to the register file 4, exists in the data cache 6. If the result shows the existence of such data in the data cache 6, then data from the register file 4 is written into the data cache 6. Additionally, regardless of the presence or absence of the data to be rewritten in the data cache 6, the memory management unit 7 issues a request to the bus control unit 8 so that the data in question is stored in the main memory 9.

Figure 2:
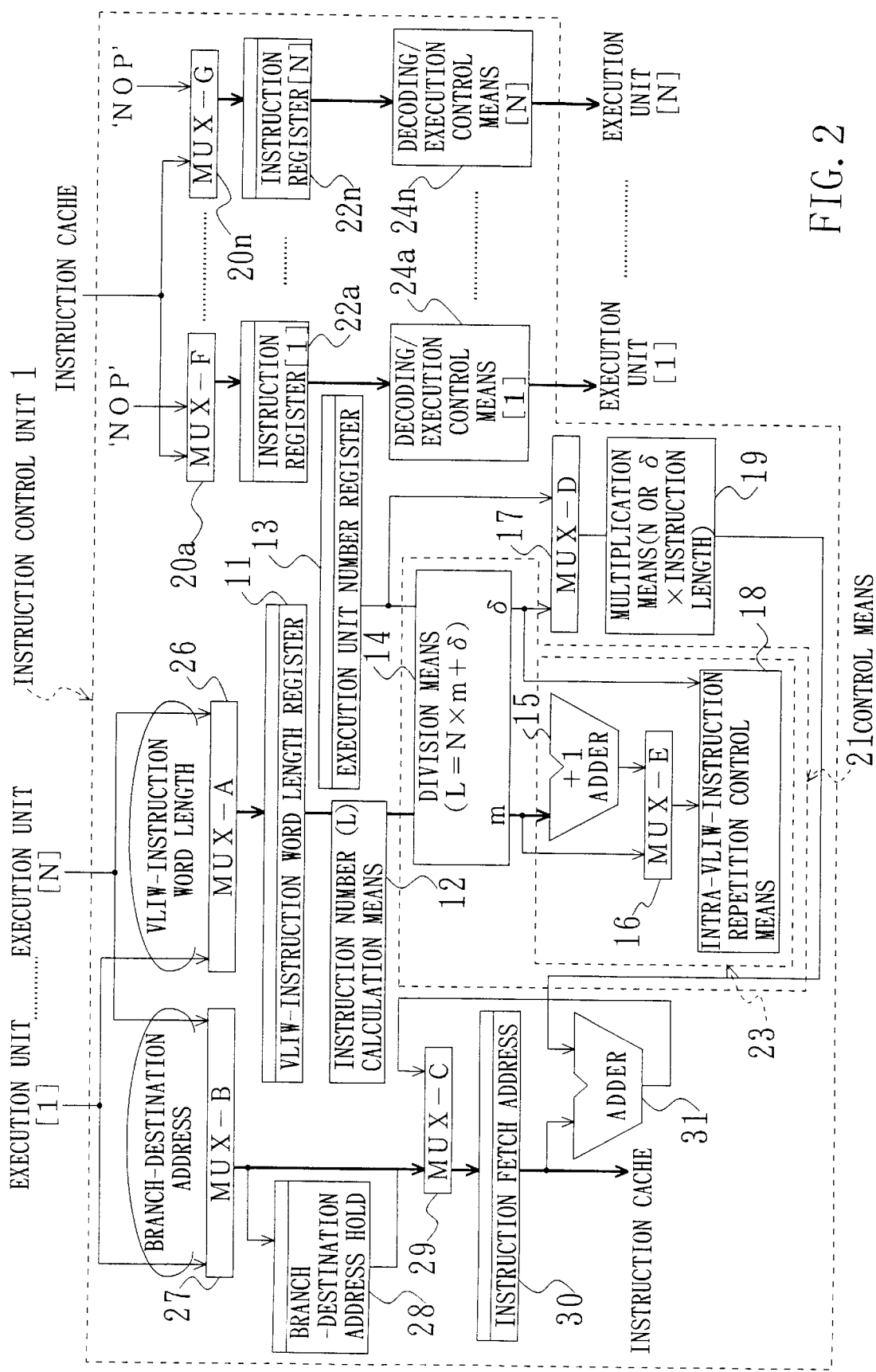
FIG. 2 depicts in block form the internal configuration of an instruction control unit of the VLIW-instruction processor.

With reference to FIG. 2, there is depicted the internal configuration of the instruction control unit 1. 11 is a VLIW-instruction word length (IWL) register. 12 is an instruction number (instruction count) (L) calculation means. 13 is an execution unit number (the number of execution units) (N) register. 21 is a control means for dividing a plurality of instructions (L instructions) forming a single VLIW-instruction into a plurality of instruction sets (m or (m+1) instruction sets) and for simultaneously performing instruction execution in parallel by the instruction set. The control means 21 has a division means 14 and an instruction control means 23. The instruction control means 23 comprises a constant "1" adder 15 and a multiplexor (MPX) 16 with two inputs and one output and an intra-VLIW-instruction repetition control means 18. 17 is an MPX with two inputs and one output. 19 is a multiplication means. 20a–20n are MPXs with two inputs and one output. 22a and 22n are instruction registers. 24a–24n are decoding/execution control means. 26 and 27 are MPXs with n inputs and one output. 28 is a branch-destination address hold register. 29 is an MPX with three inputs and one output. 30 is an instruction fetch address register. 31 is an adder.

The VLIW-instruction word length of an object program that is first executed after an IPL (the loading of an initial program) is completed and the number of execution units (N) are set by the IPL to the VLIW-instruction word length register 11 as an initial value and to the execution unit number register 13, respectively.

Figure 13:
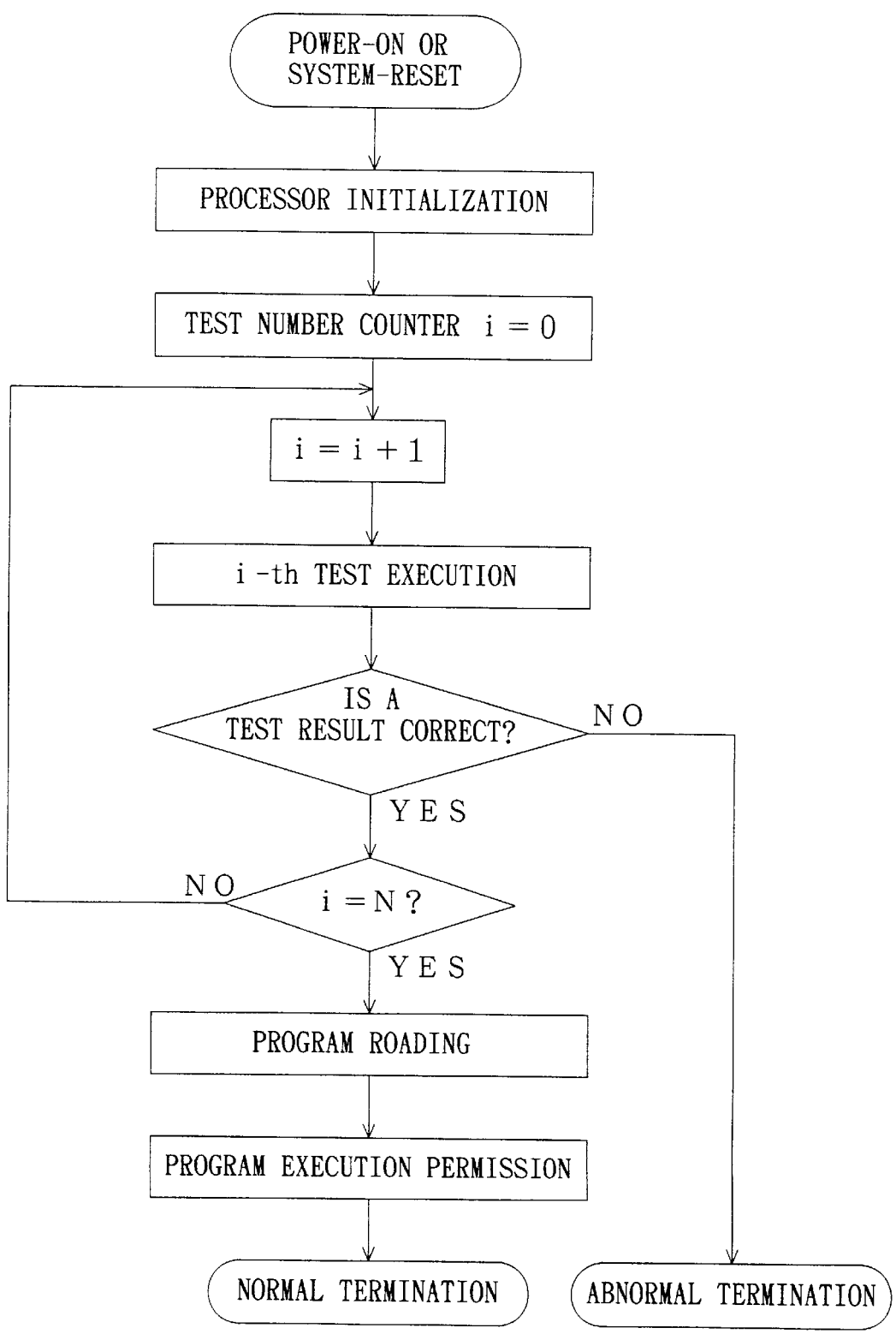
FIG. 13 is a flowchart showing the details of the loading of an initial program in the VLIW-instruction processor.

The IPL means in a narrow sense the loading of a program such as a loader in a situation in which no programs are entered into the main memory 9. Here, the IPL further means a series of processing comprising (a) setting an initial value for a processor and testing if the processor operates normally prior to the loading of a program (b) loading the program when the result shows that the processor is operable and (c) permitting the processor to execute the loaded program. This IPL is shown in detail in FIG. 13. IPL is started either after the processor is turned on or after the processor is system-reset. After the processor is started, the initial setting of the processor such as the writing of initial values to given registers is made prior to the processing of loading. Thereafter, in order to perform, n times, a test for determining if the processor normally performs its various operations, a test number counter is first set at zero. Subsequently, the test number counter is increased by one and a first test is performed. A test result is judged to be correct or not. If the result is found to be abnormal, the IPL is immediately brought to an end. If the result of the first test is normal, then the test number counter is further increased by one. If all the tests produce no abnormal results, then the processor is judged to be operable. The program is loaded and the processor is allowed to run the loaded program. When an abnormal termination occurs, either a warning lamp turns on or the alarm is activated.

When any one of the n execution units 2a–2n executes a word length rewrite instruction for the VLIW-instruction word length register 1 (described later), the MPX 26 selects a VLIW-instruction word length sent from the aforesaid execution unit for forwarding to the VLIW-instruction word length register 11.

The instruction number (L) calculation means 12 calculates an instruction number L (the number of instructions) from the VLIW-instruction word length provided from the VLIW-instruction word length register 11. In the present embodiment, a VLIW-instruction is made up of L instructions that are four bytes long. Accordingly, the VLIW-instruction word length from the VLIW-instruction word length register 11 is divided by four bytes. More specifically, the instruction number (L) calculation means 12 shifts the VLIW-instruction word length provided from the VLIW-instruction word length register 11 two bit positions to the right, to obtain L (the instruction number).

The division means 14 performs a division operation in which the instruction number L from the instruction number calculation means 12 is a dividend and the execution unit number N from the execution unit number register 13 is a divisor, to find a quotient (m) and reminder ($\delta$).

The adder 15 adds one to the quotient m. The MPX 16 selects the quotient m when $\delta=0$. When $\delta$ is not zero, the MPX 16 selects a result of the addition operation performed by the adder 15, in other words the MPX 16 selects (m+1).

The repetition control means 18 controls the entire instruction control unit 1 in order that N instructions of one VLIW-instruction are executed an equal number of times to the quotient m (i.e., m times) and, when the reminder $\delta$ is not zero, instructions, the number of which is equal to the reminder $\delta$, are executed.

When one VLIW-instruction is processed and when the quotient m is not zero, the MPX 17 repeatedly selects N outputted from the execution unit number register 13 m times. The MPX 17 selects, only when the reminder $\delta$ outputted from the division means 14 is not zero, the reminder $\delta$. If m=0, the MPX 17 selects the reminder $\delta$ outputted from the division means 14.

The multiplication means 19 performs a multiplication operation of multiplying the output of the MPX 17 by four (in the present embodiment the output is left-shifted two bit positions thereby making the two low-order bits zero, to calculate an increment in the fetch address.

The MPXs 20a–20n each select, under control of the repetition control means 18, either an instruction read out of the instruction cache 5 or "NOP". More specifically, cases, in which each MPX 20 selects "NOP" under control of the control means 18, are as follows. Each MPX 20 selects "NOP", when last (N-$\delta$) instructions of N instructions, which are read out of the instruction cache 5 when the remainder $\delta$ is not zero, are included in a subsequent VLIW-instruction. Additionally, each MPX 20 selects "NOP", when, at the point that the VLIW-instruction word length register 11 is not rewritten by a VLIW-instruction word length rewrite instruction, the IF stage (instruction fetch stage) for a subsequent VLIW-instruction is inhibited, which is described later.

The outputs of the MPXs 20a–20n are set in the instruction registers 22a–22n, respectively.

The decoding/execution control means 24a–24n decode the outputs of the instruction registers 22a–22n and instruct the execution units 2a–2n to start instruction execution. Accordingly, when any one of the instruction registers 22a–22n stores a VLIW-instruction word length rewrite instruction, a corresponding decoding/execution control means 24 decodes such a rewrite instruction and a corresponding execution unit 2 executes a rewrite instruction for the VLIW-instruction word length of the VLIW-instruction word length register 11.

The instruction fetch address register 30 stores addresses for instructions to be fetched. If no branch instruction is formed, then an address increment outputted from the multiplication means 19 is added by the adder 31 to the address of the instruction fetch address register 30. This addition result is selected by the MPX 29 and is again taken into the instruction fetch address register 30. On the other hand, if a branch instruction is formed, then the MPX 27 selects a branch address transmitted from an execution unit that now executes the branch instruction and the selected branch address is taken into the branch-designation address hold register 28.

The repetition control means 18 controls the MPXs 17, 20a–20n and 29 in order that all the instructions including a branch instruction are executed. The repetition control means 18 selects one of three different inputs as an adequate instruction address, and the selected input is taken into the instruction fetch address register 30.

In order to give an easy understanding of the main points of the present invention, a program shown in FIG. 3 is used for the description of how a VLIW-instruction processor of the present embodiment operates, since actual programs require a long program trace. With reference to the program of FIG. 3, there are shown VLIW-instructions 1 to 10. The VLIW-instructions 1, 2 and 3 each contain therein two instructions. The VLIW-instructions 4–8 each contain therein L instructions. The VLIW instructions 9 and 10 each contain therein two instructions. Also, in an actual program, an environment for the execution of a VLIW-instruction that contains therein a larger number of instructions, is prepared by a VLIW-instruction that contains therein a smaller number of instructions (FIG. 3). Generally, the VLIW-instruction processor achieves high performance for VLIW-instructions that contain large numbers of instructions and performs post-processing by VLIW-instructions that contain small numbers of instructions.

The IPL is completed normally. Eight (8) is stored as an initial value in the VLIW-instruction word length register 11, and N indicative of the number of execution units is stored in the execution unit number register 13 (for the case of FIG. 3, the number N is supposed to be above 2). The leading address of the program is stored by the IPL in the instruction fetch address register 30. At the time when the instruction control unit 1 issues an instruction fetch request both to the instruction cache 5 and to the memory management unit 7 at the same time, there is still no valid data in the instruction cache 5. As a result, a series of operations is performed so that corresponding data are transmitted from the main memory 9 to the instruction cache 5.

The instruction number calculation means 12 supplies an instruction number output of two. The division means 14 provides a quotient of zero and a remainder of two. The MPX 16 selects an output of one from the constant "1" adder 15.

The repetition control means 18 controls the MPXs 20a–20n such that first two of the MPXs 20a–20n select data from the instruction cache 5 while the remaining (N–2) MPXs select "NOP". In response to a signal informing that fetch request data is transmitted from the memory management unit 7 to the instruction cache 5, the repetition control means 18 instructs the instruction registers 22a–22n to input data.

The VLIW-instruction processor of the present embodiment is a pipelined processor and its basic pipelining is composed of four stages, that is, the IF (instruction fetch) stage, the DEC (instruction decoding/issue) stage, the EX (execution) stage and the WB (register write) stage. Generally, each stage operates in one cycle.

Figure 4:
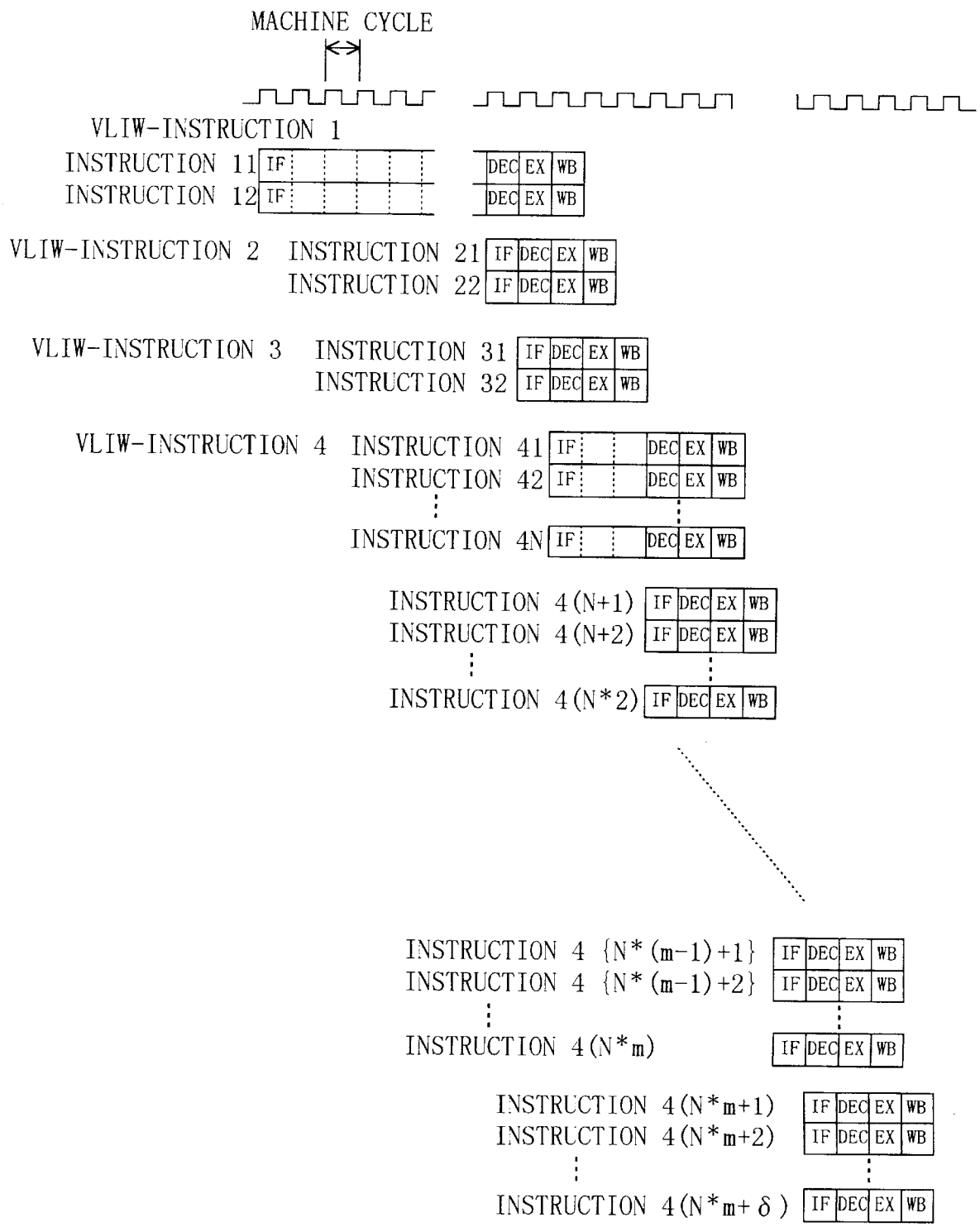
FIGS. 4, 5, 6 and 7 are diagrams respectively showing a first, second, third and fourth examples as to the effects of VLIW-instruction word length rewrite instructions on the pipeline operations of the VLIW-instruction processor.

FIG. 4 shows the pipeline operations of the VLIW-instruction processor for the VLIW-instructions 1, 2, 3 and 4. At the IF stage of the VLIW-instruction 1, there exists no valid data in the instruction cache 5 as previously described. For this reason, a series of operations is carried out for the transfer of data from the main memory 9 to the instruction cache 5.

The VLIW-instruction 1 proceeds to the DEC stage and, at the same time, the VLIW-instruction 2 enters the IF stage. Thereafter, the processing of the VLIW instructions 1, 2 and 3 is performed by means of one cycle pitch pipelining.

At the DEC stage of the VLIW-instruction 3, an instruction, which is contained in the VLIW-instruction 3 (for example, an instruction 31), is detected by one of the execution units 2a–2n to be a VLIW-instruction word length rewrite instruction. Such a detection result is notified to the repetition control means 18. In the DEC stage of the VLIW-instruction 3, the repetition control means 18 issues an instruction fetch request for the fetching of the VLIW-instruction 4. However, at this point in time, it is difficult to determine whether the VLIW-instruction word length increases or decreases until the time a new VLIW-instruction word length is stored in the VLIW-instruction word length register 11. For this reason, no instruction fetch requests are issued and it is controlled such that each MPX 20a–20n selects "NOP" until two instructions contained in the VLIW-instruction 3 enter the WB stage. Thereafter, at the point in time when the two instructions are in the WB stage, L (instruction number) is written by the VLIW-instruction word length rewrite instruction into the VLIW-instruction word length register 11. The division means 14 provides m (the quotient) and δ (the reminder) and, if the quotient m is not equal to zero, then the repetition control means 18 controls each MPX 20a–20n to select data from the instruction cache 5 in order that at the next cycle the DEC stage starts for first N instructions of the VLIW-instruction 4.

As soon as the foregoing first N instructions of the VLIW-instruction 4 each proceed to the DEC stage, the output of the adder 31 selected by the MPX 29 is fed into the instruction fetch address register 30. This output (address) is a value as a result of adding (N×4) that is the output of the multiplication means 19 to the leading address of the VLIW-instruction 4.

The m-th DEC stage of the VLIW-instruction 4 is reached. At the same time, in order to process the last δ instructions of the VLIW-instruction 4, at the IF stage thereof, the repetition control means 18 controls the MPXs 20a–20n such that first δ MPXs of the MPXs 20a–20n select data from the cache 5 and the remaining (N–δ) MPXs select "NOP". The multiplication means 19 provides an output of (δ×4) and, at the next cycle, the instruction fetch address register 30 is fed an address resulting from adding m(N×4) +(δ×4) to the leading address of the VLIW-instruction 4, that is, the leading address of the VLIW-instruction 5.

The VLIW-instruction 5, the VLIW-instruction 6 and the VLIW-instruction 7 are executed in the same way that the VLIW-instruction 4 is executed.

The VLIW-instruction 8 contains a VLIW-instruction word length rewrite instruction. Depending upon the position of this VLIW-instruction word length rewrite instruction in the VLIW-instruction 8, the IF stage for the VLIW-instruction 8 is inhibited or not. This IF stage inhibition control is illustrated by making reference to FIGS. 5, 6 and 7.

Figure 5:
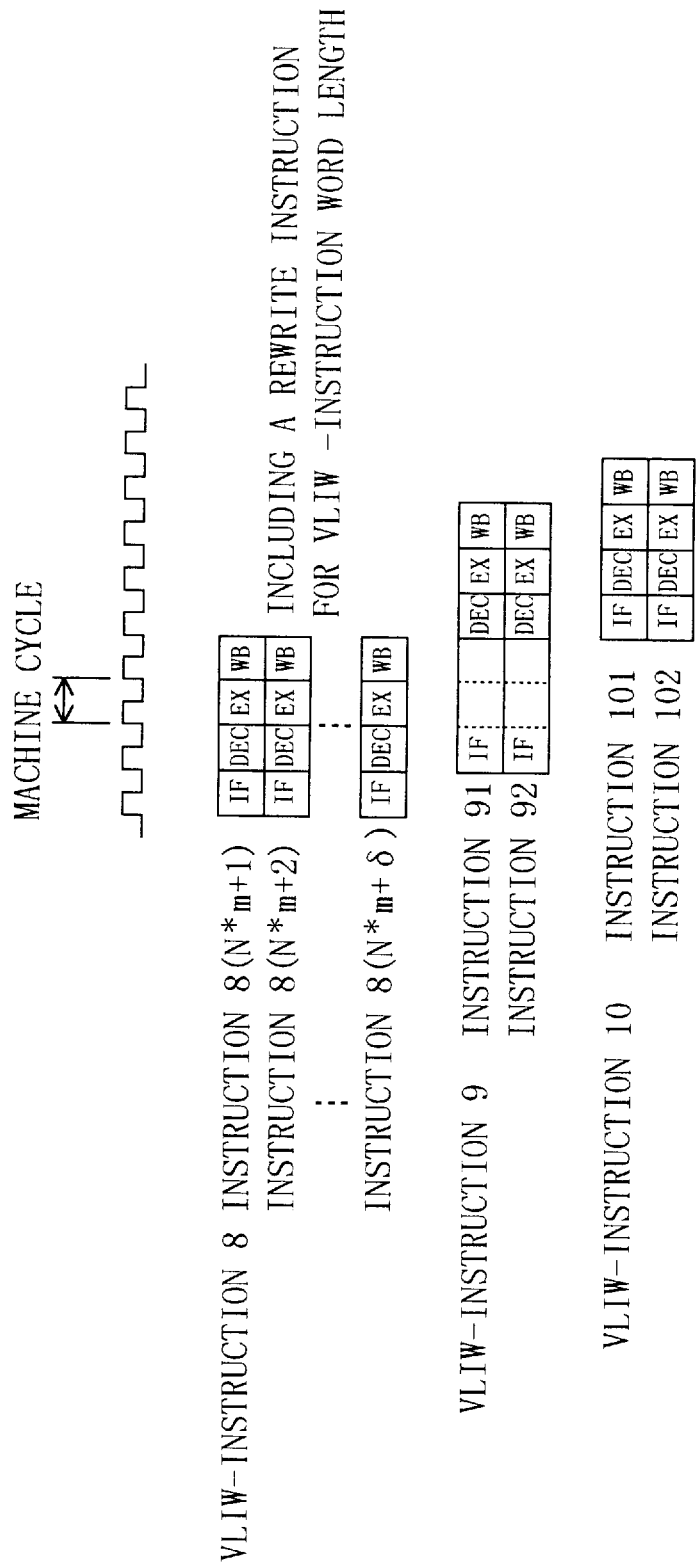

In an example case shown in FIG. 5, of all instruction sets of the VLIW-instruction 8, one instruction set that is the last to be processed contains a VLIW-instruction word length rewrite instruction. At the DEC stage of this instruction set, the VLIW-instruction word length rewrite instruction is detected so that the IF stage of the VLIW-instruction 9 is inhibited for the period of two cycles. At the point when the WB stage of one of instruction sets of the VLIW-instruction 8 that is the last to be processed commences, the VLIW-instruction word length register 11 is updated and the IF stage of the VLIW-instruction 9 starts.

Figure 6:
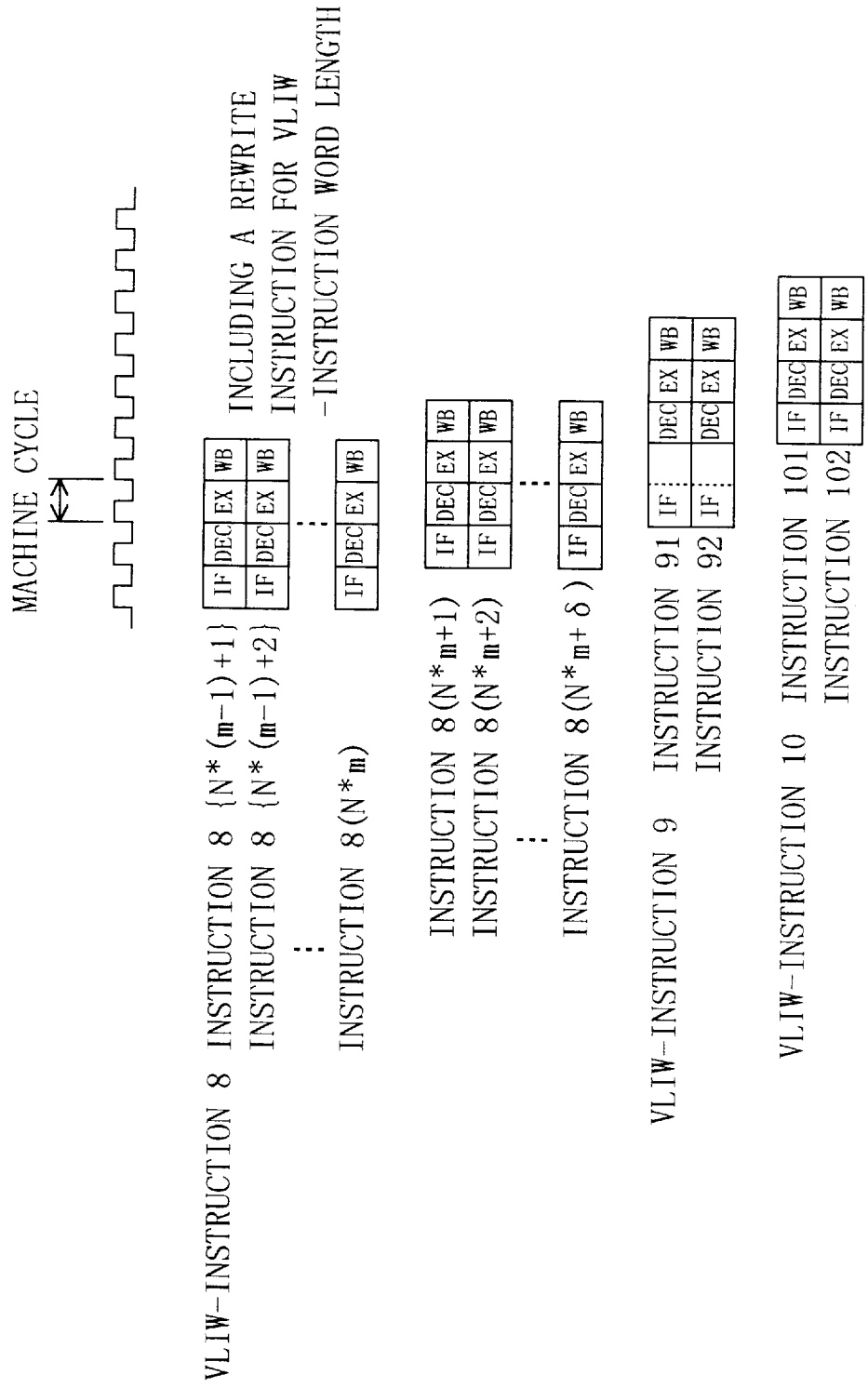

In an example case shown in FIG. 6, one of all instruction sets of the VLIW-instruction 8, which is processed one machine cycle before the processing of the last of the instruction sets, contains a VLIW-instruction word length rewrite instruction. At the DEC stage of this rewrite instruction-containing instruction set, the presence of the VLIW-instruction word length rewrite instruction is detected and the IF stage of the VLIW-instruction 9 is inhibited for the period of one cycle. When the WB stage of the instruction set begins, the VLIW-instruction word length register length 11 is updated and, at the same time, the IF stage of the VLIW-instruction 9 starts.

Figure 7:
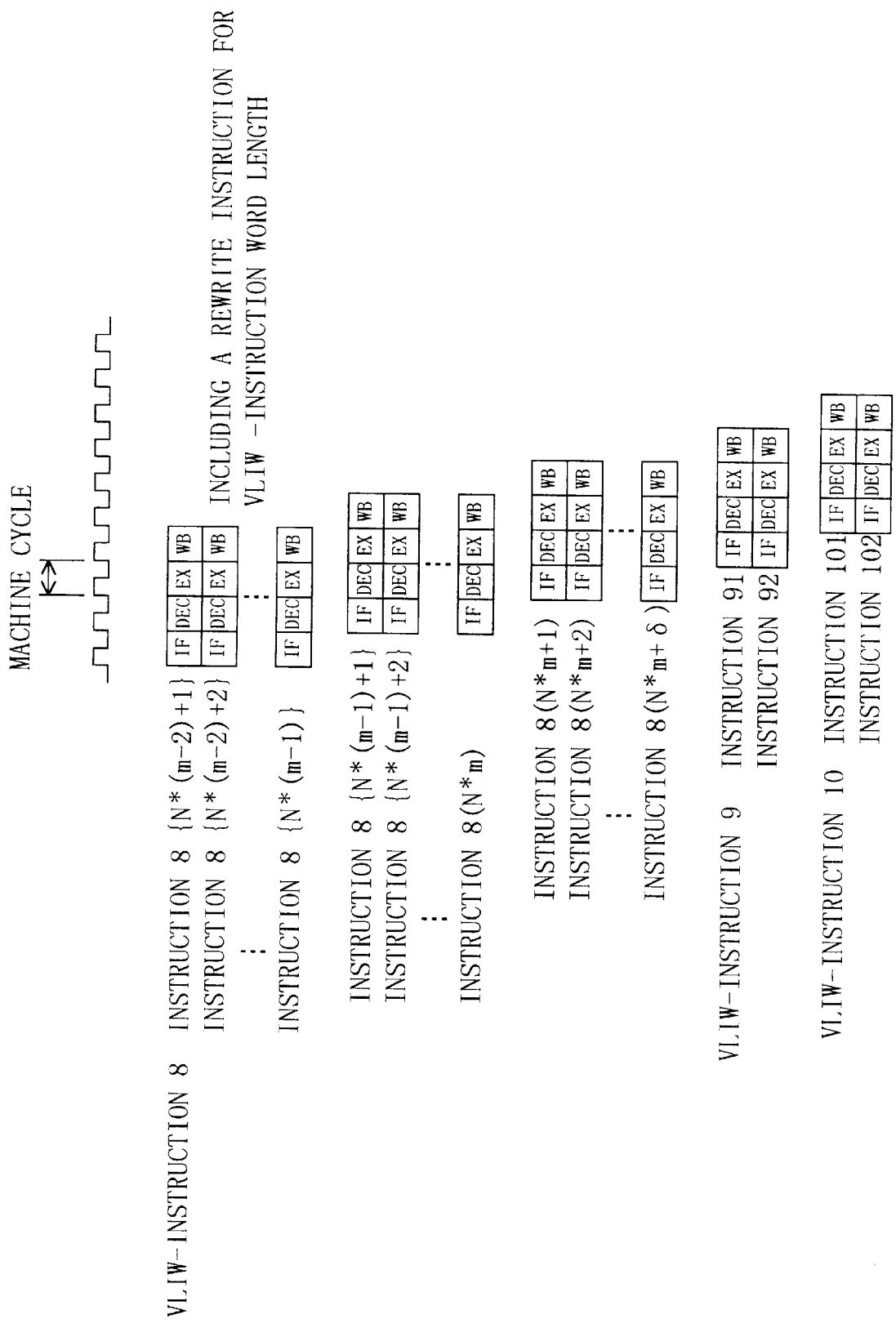

In an example case shown in FIG. 7, one of the instruction sets of the VLIW-instruction 8, which is processed two machine cycles before the processing of the last of the instruction sets, contains a VLIW-instruction word length rewrite instruction. At the stage DEC of the rewrite instruction-containing instruction set arranged two positions ahead of the last of the instruction sets, the presence of the VLIW-instruction word length rewrite instruction is detected. When the WB stage of the instruction set in question begins, the VLIW-instruction word length register 11 is updated and, at the same time, the IF stage of the VLIW-instruction 9 commences. Therefore, the inhibition of the IF stage due to the updating of the VLIW-instruction word length register 11 does not occur.

Figure 8:
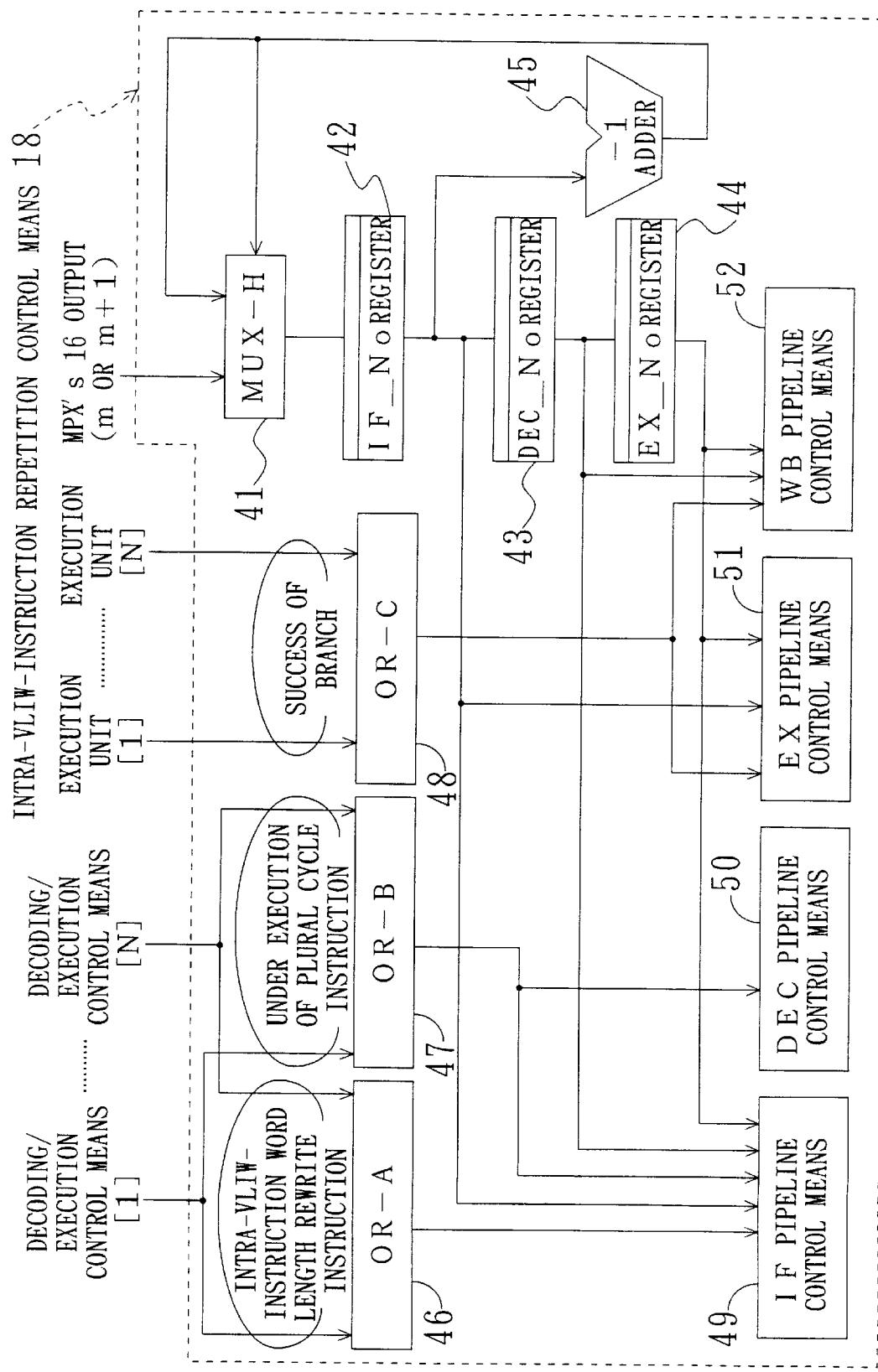
FIG. 8 depicts in block form the internal configuration of an intra-VLIW-instruction repetition control means of the instruction control unit.

Referring now to FIG. 8, there is shown the internal configuration of the repetition control means 18. An example of a pipeline control means for controlling the foregoing pipeline operations is shown. 41 is an MPX (multiplexor). 42 is an IF number register. 43 is a DEC number register. 44 is an EX number register. 45 is a constant subtracter. Each 46, 47 and 48 is an OR circuit with N inputs. 49 is an IF pipeline control means. 50 is a DEC pipeline control means. 51 is an EX pipeline control means. 52 is a WB pipeline control means.

The MPX 41 selects the output of the MPX 16 when the output of the constant subtracter 45 is "0". The MPX 41 selects the output of the constant subtracter 45 when the output of the constant subtracter 45 is not "0".

Values of "1", "0" and "0" are set by the IPL to the IF number register 42, to the DEC number register 43 and to the EX number register 44, respectively, as their initial values. These three number registers 42–44 each give an indication of how many instruction sets, each of which contains therein N or δ instructions, are left unprocessed in a VLIW-instruction.

One of the N decoding/execution control means 24a–24n detects the presence of a VLIW-instruction word length rewrite instruction. This rewrite instruction is transmitted through the N-input OR circuit 46 to the IF pipeline control means (instruction fetch pipeline control means) 49. In response to such transmission, the IF pipeline control means 49 provides directions as to the IF stage. When the DEC number register 43 provides an output of "1", the IF stage is inhibited by the control means 49 for two cycles. When the DEC number register 43 provides an output of "2", the IF stage is inhibited for one cycle. When the DEC number register 43 provides an output of "3" or more, the IF stage is not inhibited.

The operation of branch instructions is now described by making reference to FIGS. 9–12.

Figure 9:
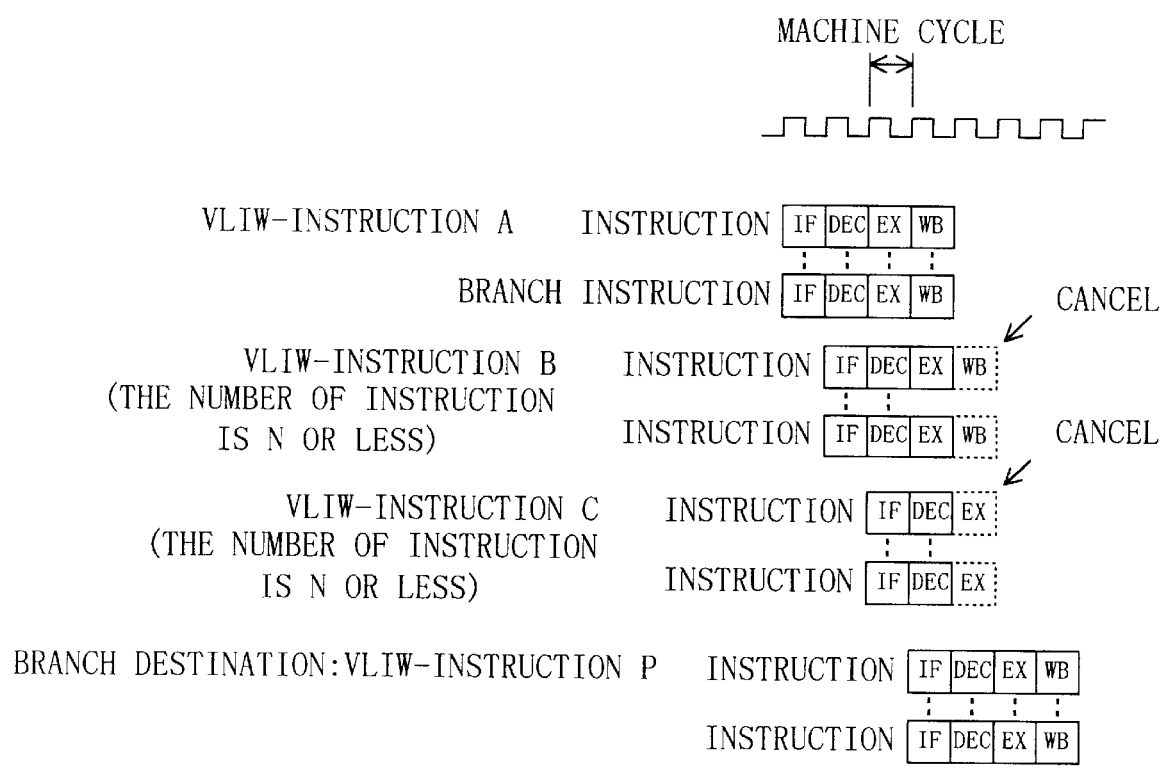
FIGS. 9, 10, 11 and 12 are diagrams respectively showing a first, second, third and fourth examples as to the effects of branch instructions on the pipeline operations of the VLIW-instruction processor.

In the VLIW-instruction processor of the present embodiment, (a) there are no constraints imposed on the branch instruction position in a VLIW-instruction, (b) the destination of branching always designates the leading address of the VLIW-instruction and (c) branching takes places after the processing of an instruction following the branch instruction. This conforms to the previously-mentioned definition of the VLIW-instruction In an example case shown in FIG. 9, one of a plurality of instruction sets belonging to a VLIW-instruction A, which is the last to be processed in the VLIW-instruction A, contains an branch instruction. At the end of the EX stage of the instruction set in question, the formation of a branch to a VLIW-instruction P is ascertained. At the WB stage of the instruction set, a branch-destination address is written into the instruction fetch address register 30. A VLIW-instruction B and a VLIW-instruction C, which are not allowed to be processed due to such branch formation, overrun for extra one cycle and are cancelled at their WB and EX stages. Since the IF stage of one of instruction sets of the VLIW-instruction P (branch destination) and the WB stage of the aforesaid one of the instruction sets of the VLIW-instruction A that is the last to be processed are at the same cycle. Accordingly, the overhead of the branch instruction in the case of FIG. 9 is two cycles.

Figure 10:
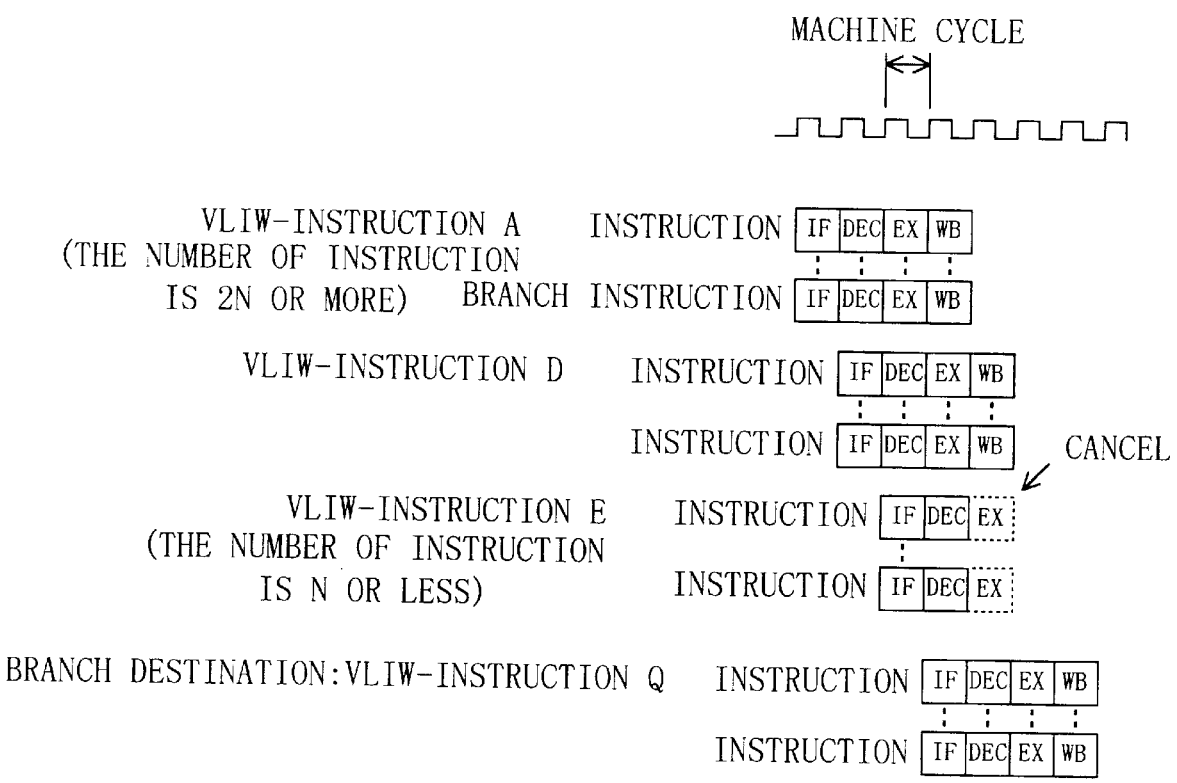

In an example case as shown in FIG. 10, a branch instruction is contained in one of instruction sets of a VLIW-instruction D that is processed one machine cycle before the processing of the last of the instruction sets and, at the end of the EX stage of the branch instruction-containing instruction set, the formation of a branch to a VLIW-instruction Q is ascertained. At the WB stage of the instruction set, a branch-destination address is written into the instruction fetch address register 30. A VLIW-instruction E, which is not allowed to be executed because of such branch formation, overruns for extra one cycle and is cancelled at the EX stage. Since the IF stage of one of instruction sets of the VLIW-instruction Q that is the first to be executed and the EX stage of the instruction set of the VLIW-instruction A that is the last to be executed are at the same cycle. Accordingly, the overhead of the branch instruction in the case of FIG. 10 is one cycle.

Figure 11:
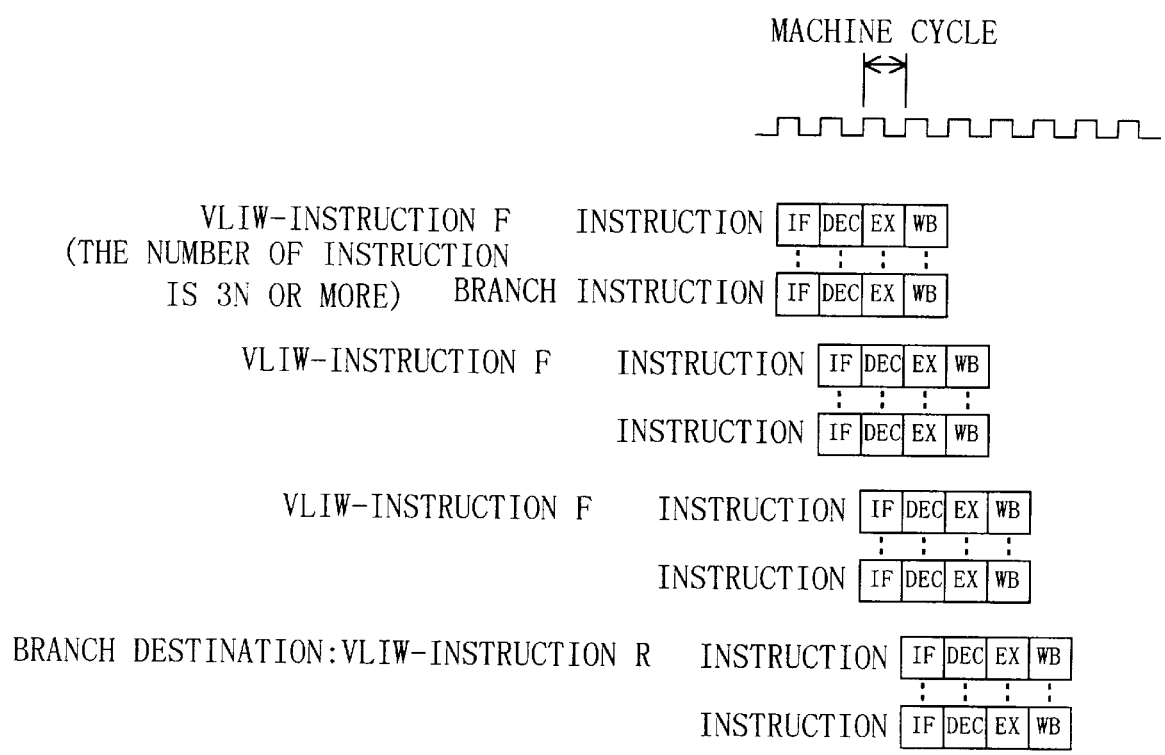

In an example case as shown in FIG. 11, a branch instruction is contained in one of a plurality of instruction sets of a VLIW-instruction F that is processed two machine cycles before the processing of the last instruction set of the VLIW-instruction F. At the end of the EX stage of the instruction set, the formation of a branch to a VLIW-instruction R is ascertained. At the beginning of the WB stage of the instruction set, the MPX 29 selects not the leading address of a VLIW-instruction following the VLIW-instruction F but the leading address of the VLIW-instruction R which is a branch destination, whereby the leading address of the VLIW-instruction R is written into the instruction fetch address register 30. Accordingly, for the case of FIG. 1, the branch instruction causes no overhead.

Figure 12:
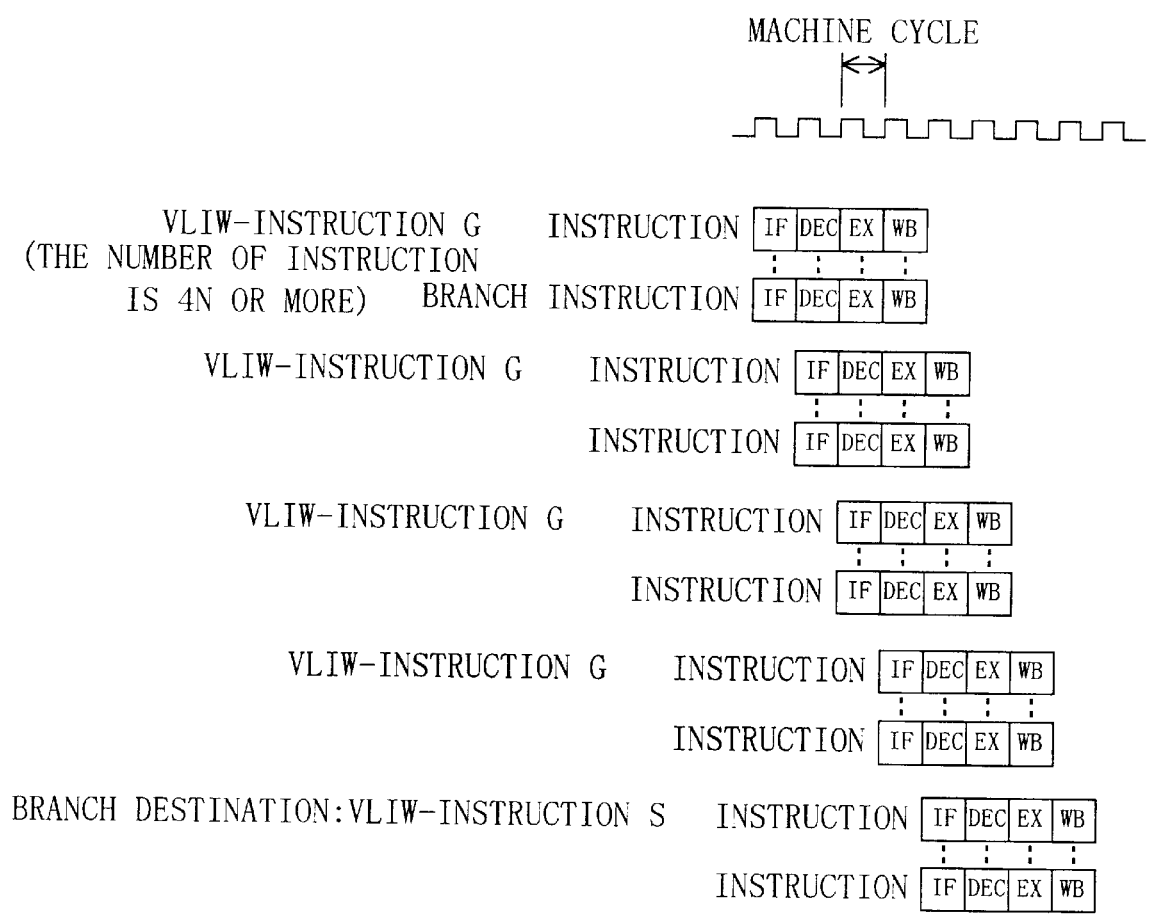

In an example case as shown in FIG. 12, a branch instruction is contained in one of instruction sets of a VLIW-instruction G that is processed three machine cycles before the processing of the last of these instruction sets. At the end of the EX stage of the branch instruction-containing instruction set, the formation of a branch to a VLIW-instruction S is ascertained. At the beginning of the WB stage of the instruction set, the leading address of the VLIW-instruction S is once written into the branch-destination address hold register 28. After one cycle therefrom, the output of the register 28 is selected by the MPX 29 for writing to the instruction fetch address register 30. Also, in the case of FIG. 12, the branch instruction causes no overhead.

With reference to FIG. 8, the operations of FIG. 9 to FIG. 12 are described.

The taking of a branch is detected in any one of the N execution units 2a–2n and such detection information is transmitted, via the N-input OR circuit 48, to the EX pipeline control means 51 and to the WB pipeline control means 52.

The EX pipeline control means (execution pipeline control means) 51 latches, at the beginning of the next cycle, branch taking information and a value resulting from subtracting the output of the IF number register 42 from the output of the EX number register 44. The EX pipeline control means 51 cancels the EX stage of one cycle later when two conditions that (i) a branch is taken and (ii) the difference is zero or negative hold.

The WB pipeline control means (write pipeline control means) 52 latches, at the beginning of the next cycle, branch taking information and a value resulting from subtracting the output of the DEC number register 43 from the output of the EX number register 44. The WB pipeline control means 52 cancels the WB stage of one cycle later when two conditions that (i) a branch is taken and (ii) the difference is zero or negative hold.

When two conditions that (i) a branch is taken before latch and (ii) the output of the EX number register 44 is 3 or less hold, the WP pipeline control means 52 has a control function so that the MPXs 27 and 29 select a branch-destination address transmitted from any one of the N execution units 2a–2n and the instruction fetch address register 30 takes in the branch-destination address at the next cycle.

Additionally, when two conditions that (i) a branch is taken before latch and (ii) the output of the EX number register 44 is 4 or more hold, the WB pipeline control means 52 has a control function so that the MPX 27 selects a branch-designation address supplied from any one of the N execution units 2a–2n and the designation-address hold register 28 takes in the branch-designation address at the next cycle. Thereafter, the output of the EX number register 44 becomes 3 and, at the same timing that an instruction set corresponding to this EX number of 3 proceeds to the WB stage, the output of the branch-designation address hold register 28 is selected by the MPX 29 and is taken into the instruction fetch address register 30.

According to the above-described branch instruction operation, it becomes possible to perform the embedding of an instruction following a branch instruction contained in a single VLIW-instruction, with more flexibility in relation to a delay branch instruction method.

With reference to FIG. 4, it is described that a VLIW-instruction processor having a VLIW-instruction word length register 11 that is a feature of the present invention is able to utilize a program library for a convention VLIW-instruction processor having no VLIW-instruction word length registers 11.

Figure 14:
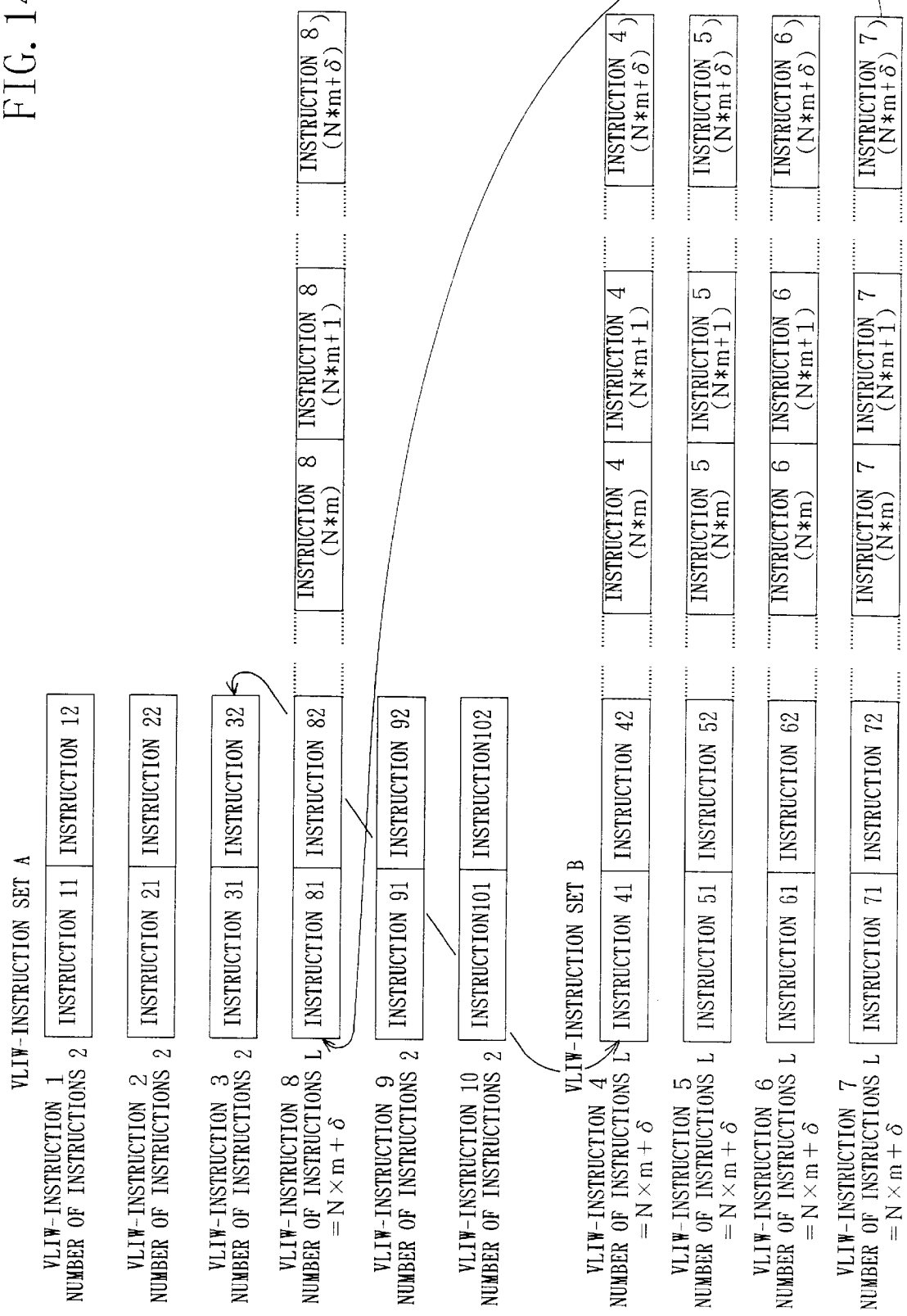
FIG. 14 is a diagram useful in understanding a case in which an object program for a commonly-used VLIW-instruction processor is utilized in the VLIW-instruction processor of the present invention.

Refereeing to FIG. 14, the VLIW-instruction group A includes a VLIW-instruction word length rewrite instruction. The VLIW-instruction group B is a program contained in a program library of a conventional VLIW-instruction processor. In this operation description, an example case is explained in which after the VLIW-instruction set A is executed up to a VLIW-instruction 3 every instruction contained in the conventional VLIW-instruction set B is executed, and the instruction execution processing returns back to the VLIW-instruction set A. Also in FIG. 14, program simplification is made for providing an easy understanding of the main points of the present invention.

In instructions 11 and 12 of a VLIW-instruction 1 of the VLIW-instruction set A and an instruction 21 of a VLIW-instruction 2 of the VLIW-instruction set A, data for use by the VLIW-instruction set B are prepared such that the data can be referred to by instructions constituting a VLIW-instruction in the VLIW-instruction set B. Next, in an instruction 22 of the VLIW-instruction 2 in the VLIW-instruction set A, the leading address of a VLIW-instruction 8 in the VLIW-instruction set A, i.e., a return address, is set to a 0-th register of the register file 4. An instruction 31 of a VLIW-instruction 3 in the VLIW-instruction set A contains therein a VLIW-instruction word length rewrite instruction. This rewrite instruction is an instruction that rewrites an instruction word length into one for the VLIW-instruction set B for use by the conventional VLIW-instruction processor. The instruction word length of the VLIW-instruction word length register 11 is rewritten into such an instruction word length. In an instruction 32 of a VLIW-instruction 3 of the VLIW-instruction set A, a branch instruction, which is the first to branch in the conventional VLIW-instruction set B, exists and, accordingly, at the beginning of the VLIW-instruction set B, branching occurs. VLIW-instructions 5, 6 and 7, each of which contains L instructions, are executed. The last VLIW-instruction 7 contains a branch instruction the address of which is the contents of the 0-th register of the register file 4. The execution of this instruction causes the instruction execution processing to return to the VLIW-instruction 8 of the VLIW-instruction set A. This VLIW-instruction 8 has the same number of instructions, i.e., L instructions, as each VLIW-instruction 5, 6 and 7 of the VLIW-instruction set B. The VLIW-instruction 8 contains a VLIW-instruction word length rewrite instruction. By this rewrite instruction, the VLIW-instruction word length is rewritten. Thereafter, the execution of VLIW-instructions with a rewritten VLIW-instruction word length, e.g., the VLIW-instructions 9 and 10 each of which is composed of two instructions, is performed. At the time of returning from the VLIW-instruction set B to the VLIW-instruction set A, the VLIW-instruction word length register 11 is not rewritten yet. For this reason, the VLIW-instruction word length of this VLIW-instruction 8 that is the first to be executed in the VLIW-instruction set A is required to be the same as that of the VLIW-instruction of the VLIW-instruction set B before such a return.

Figure 15:
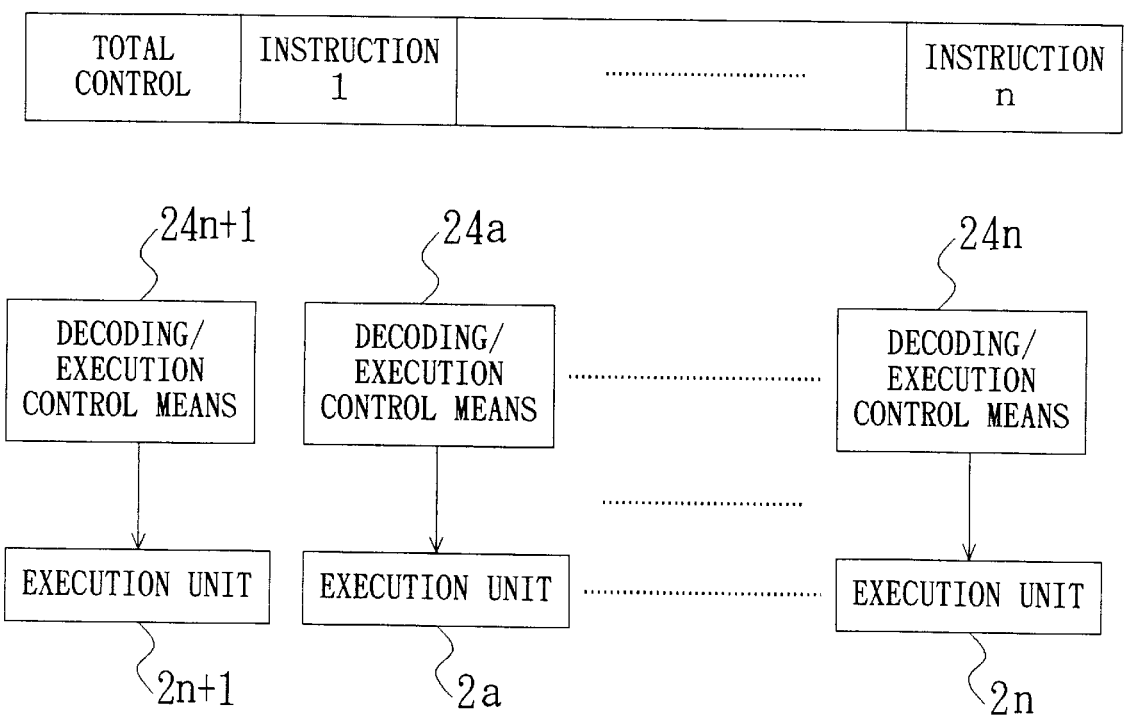
FIG. 15 is a diagram showing a modification example of cases in which a VLIW-instruction with a field indicative of a VLIW-instruction word length is used.

In the present embodiment, of a plurality of instructions forming a VLIW-instruction, one contains a VLIW-instruction word length rewrite instruction, which is not be considered restrictive. The following configuration may be used. For instance, in a VLIW instruction in which a VLIW-instruction word length is indicated within a field of a total control section located at the leading part of the VLIW instruction (see FIG. 15), a decoding/control means 24n+1 dedicated to decoding that VLIW-instruction word length is provided. The VLIW-instruction word length controlled and decoded by the decoding/control means 24n+1 is stored into the VLIW-instruction word length 11. In addition, an execution unit 2n+1 may be provided dedicating to the updating of VLIW-instruction word lengths stored in the VLIW-instruction word length register 11.

SECOND EMBODIMENT

Figure 16:
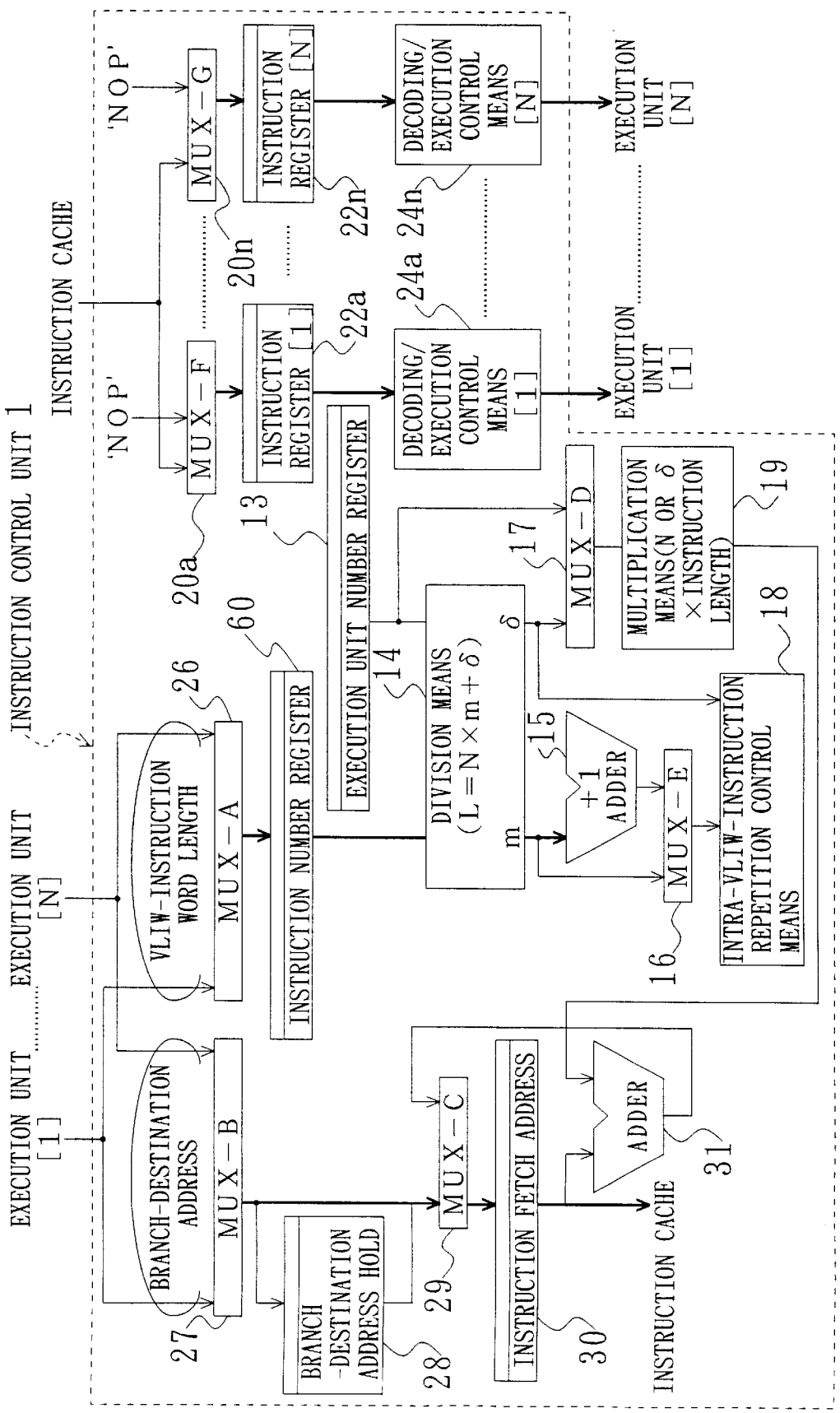
FIG. 16 depicts in block form the internal configuration of an instruction control unit of a variable word length VLIW-instruction processor in accordance with a second embodiment of the present invention.

A second embodiment of the present invention is described by making reference to FIG. 16. FIG. 16 shows an instruction control unit 1' resulting from partially modifying the instruction control unit 1 of the first embodiment. These two instruction control units 1 and 1' are identical in configuration with each other, with the exception of the following points. More specifically, the VLIW-instruction word length register 11 and the instruction number calculation means 12 of the interaction control unit 1 are removed, and the instruction number register 60 is provided. In the first embodiment, a VLIW-instruction word length is rewritten by a word length rewrite instruction contained in a VLIW-instruction and is stored in the VLIW-instruction word length register 11, and the instruction word length is divided by the instruction number calculation means 12 by the bit length of one instruction. On the other hand, in the present embodiment, the instruction-number register 60 is placed. As a result of such provision, in a VLIW-instruction, an instruction (instruction number rewrite instruction) is included which is able to rewrite and update the number of instructions contained in the VLIW-instruction to a desirable number of instructions. This is simply to rewrite the word of "VLIW-instruction word length rewrite instruction" to the word of "instruction number rewrite instruction" and no relevant drawing figures are shown for the purpose of description. In the present embodiment, individual instructions contained in a VLIW instruction are not necessarily identical in bit length with one another and they may differ from one another.

The invention claimed is:

1. A variable word length VLIW-instruction processor, comprising:

a plurality of execution units, each of which executing an instruction;

a VLIW-instruction word length register for storing a VLIW-instruction word length; and an instruction control unit;

said instruction control unit receiving a VLIW-instruction composed of a plurality of instructions including a VLIW-instruction word length rewrite instruction;

said instruction control unit rewriting, based on said VLIW-instruction word length rewrite instruction, said VLIW-instruction word length stored in said VLIW-instruction word length register;

said instruction control unit controlling, based on said rewritten VLIW-instruction word length, parallel execution of the instructions performed by at least two of said plurality of execution units.

2. A variable word length VLIW-instruction processor according to claim 1 wherein said word length rewrite instruction is executed by any one of said plurality of execution units.

3. A variable word length VLIW-instruction processor according to claim 1 wherein said VLIW-instruction has a field indicating said VLIW-instruction word length.

4. A variable word length VLIW-instruction processor according to claim 3, further comprising:

an execution unit dedicated to the rewriting of said VLIW-instruction word length stored in said VLIW instruction word length register; and a decoding/control means;

said decoding/control means decodes said VLIW-instruction word length indicated by said field of said VLIW-instruction;

said decoding/control means controls said execution unit in order that said VLIW-instruction word length stored in said VLIW-instruction word length register is rewritten based on said decoded VLIW-instruction word length.

5. A variable word length VLIW-instruction processor according to claim 1, wherein
a single VLIW-instruction is formed of a plurality of instructions wherein each of said plurality of instructions has a same predetermined bit length;
said instruction control unit includes an instruction number calculation means that performs a division operation of dividing said VLIW-instruction word length stored in said VLIW-instruction word length register by said predetermined bit length in order to calculate a number of instructions contained in said VLIW-instruction.

6. A variable word length VLIW-instruction processor according to claim 1, said instruction control unit including a control means for dividing a plurality of instructions making up a single VLIW-instruction into a plurality of instruction sets, and for controlling parallel execution of said instruction sets.

7. A variable word length VLIW-instruction processor according to claim 6, said control means including:
a division means for performing a division operation of the number of instructions forming a single VLIW-instruction as a dividend and the number of said execution units as a divisor, to find a quotient and a reminder; and
an instruction control means; wherein
when said quotient is not zero, said instruction control means controls said plurality of execution units to perform parallel execution of a number of instructions equal to the number of said plurality of execution units, a number of times equivalent to said quotient; and
when said remainder is not zero, said instruction control means controls a number of said plurality of execution units equal to said remainder, to perform parallel instruction execution; and
when said quotient is zero, said instruction control means controls a number of said plurality of execution units equal to said remainder, to perform parallel instruction execution.

8. A variable word length VLIW-instruction processor according to claim 6 or claim 7 wherein said VLIW-instruction contains said VLIW-instruction word length rewrite instruction in one of said plurality of instruction sets that is to be executed last.

9. A variable word length VLIW-instruction processor according to claim 8, wherein
said instruction control unit includes an instruction fetch pipeline control means;
said instruction fetch pipeline control means, based on a location of one of said plurality of instruction sets that contains said VLIW-instruction word length rewrite instruction, inhibits an instruction that is to be executed first in a subsequent VLIW-instruction from being fetched.

10. A variable word length VLIW-instruction processor according to claim 6 or claim 7 wherein said VLIW-instruction contains said VLIW-instruction word length rewrite instruction in one of said plurality of instruction sets that is to be executed second to last.

11. A variable word length VLIW-instruction processor according to claim 10, wherein said instruction control unit includes an instruction fetch pipeline control means;
said instruction fetch pipeline control means, based on a location of one of said plurality of instruction sets that contains said VLIW-instruction word length rewrite instruction, inhibits an instruction that is to be executed first in a subsequent VLIW-instruction from being fetched.

12. A variable word length VLIW-instruction processor according to claim 6 or claim 7 wherein said VLIW-instruction contains said VLIW-instruction word length rewrite instruction in one of said plurality of instruction sets that is to be executed third to last.

13. A variable word length VLIW-instruction processor according to claim 12, wherein
said instruction control unit includes an instruction fetch pipeline control means;
said instruction fetch pipeline control means, based on a location of one of said plurality of instruction sets that contains said VLIW-instruction word length rewrite instruction, inhibits an instruction that is to be executed first in a subsequent VLIW-instruction from being fetched.

14. A variable word length VLIW-instruction processor according to claim 6 or claim 7 wherein some VLIW-instruction contains a branch instruction in one of said plurality of instruction sets that is to be executed last.

15. A variable word length VLIW-instruction processor according to claim 14, wherein said instruction control unit includes an execution pipeline control means and write pipeline control means for cancelling, based on a location of one of said plurality of instruction sets that contains said branch instruction, execution of an instruction contained in a subsequent VLIW-instruction that is to be executed first in said subsequent VLIW-instruction.

16. A variable word length VLIW-instruction processor according to claim 15,
said instruction control unit further including a branch-destination address hold register for storing a branch-destination address for said branch instruction contained in said VLIW-instruction.

17. A variable word length VLIW-instruction processor according to claim 6 or claim 7 wherein some VLIW-instruction contains a branch instruction in one of said plurality of instruction sets that is to be executed second to last.

18. A variable word length VLIW-instruction processor according to claim 17, wherein said instruction control unit includes an execution pipeline control means and write pipeline control means for cancelling, based on a location of one of said plurality of instruction sets that contains said branch instruction, execution of an instruction contained in a subsequent VLIW-instruction that is to be executed first in said subsequent VLIW-instruction.

19. A variable word length VLIW-instruction processor according to claim 18, said instruction control unit further including a branch-destination address hold register for storing a branch-destination address for said branch instruction contained in said VLIW-instruction.

20. A variable word length VLIW-instruction processor according to claim 6 or claim 7 wherein some VLIW-instruction contains a branch instruction in one of said plurality of instruction sets that is to be executed third to last.

21. A variable word length VLIW-instruction processor according to claim 20, wherein said instruction control unit includes an execution pipeline control means and write pipeline control means for cancelling, based on a location of one of said plurality of instruction sets that contains said branch instruction, execution of an instruction contained in a subsequent VLIW-instruction that is to be executed first in said subsequent VLIW-instruction.

22. A variable word length VLIW-instruction processor according to claim 21, said instruction control unit further including a branch-destination address hold register for storing a branch-destination address for said branch instruction contained in said VLIW-instruction.

23. A variable word length VLIW-instruction processor according to claim 1 wherein said VLIW-instruction word length stored in said VLIW-instruction word length register is initialized upon power-on or system-reset.

24. A variable word length VLIW-instruction processor according to claim 1 wherein, upon running an object program for a processor that executes a VLIW-instruction which is identical in instruction format with said VLIW-instruction and which is different in the number of execution units from said VLIW-instruction, said VLIW instruction word length stored in said VLIW instruction word length register is rewritten based on said VLIW-instruction rewrite instruction that is executed one instruction ahead of a leading part of said object program.

25. A variable word length VLIW-instruction processor, comprising:
    a plurality of execution units for executing instructions;
    an instruction number register for storing a number of instructions contained in a VLIW-instruction; and
    an instruction control unit;
    said instruction control unit receiving a VLIW-instruction composed of a plurality of instructions including an instruction number rewrite instruction;
    said instruction control unit rewriting, based on said instruction number rewrite instruction, said instruction number stored in said instruction number register;
    said instruction control unit controlling, based on said rewritten instruction number, the parallel execution of the instructions performed by at least two of said plurality of execution units.

26. A variable word length VLIW-instruction processor according to claim 25 wherein said instruction number rewrite instruction is executed in any one of said plurality of execution units.

27. A variable word length VLIW-instruction processor according to claim 25 wherein said VLIW-instruction is a VLIW-instruction with a field indicative of the number of instructions.

28. A variable word length VLIW-instruction processor according to claim 27, said VLIW-instruction processor further comprising:
    an execution unit dedicated to rewriting said instruction number stored in said instruction number register; and
    a decoding/control means;
    said decoding/control means decodes said instruction number indicated by said field of said VLIW-instruction;
    said decoding/control means controls said execution unit in order that said instruction number stored in said instruction number register is rewritten based on said decoded instruction number.

29. A variable word length VLIW-instruction processor according to claim 25, wherein
    said instruction control unit includes a control means for dividing a plurality of instructions making up a single VLIW instruction into a plurality of instruction sets, and for controlling parallel execution of said instruction sets.

30. A variable word length VLIW-instruction processor according to claim 25, said control means including:
    a division means for performing a division operation of the number of instructions forming a single VLIW-instruction as a dividend and the number of said execution units as a divisor, to find a quotient and a reminder; and
    an instruction control means; wherein
    when said quotient is not zero, said instruction control means controls said plurality of execution units to perform parallel execution of a number of instructions equal to the number of said execution units, a number of times equivalent to said quotient;
    when said remainder is not zero, said instruction control means controls a number of said plurality of execution units equal to said remainder, to perform parallel instruction execution;
    when said quotient is zero, said instruction control means controls a number of said plurality of execution units equal to said remainder, to perform parallel instruction execution.

31. A variable word length VLIW-instruction processor according to claim 29 or claim 30 wherein said VLIW-instruction contains said instruction number rewrite instruction in one of said plurality of instruction sets that is to be executed last.

32. A variable word length VLIW-instruction processor according to claim 31, wherein
    said instruction control unit includes an instruction fetch pipeline control means;
    said instruction fetch pipeline control means based on a location of one of said plurality of instruction sets that contains said instruction number rewrite instruction, inhibits an instruction that is to be executed first in a subsequent VLIW-instruction from being fetched.

33. A variable word length VLIW-instruction processor according to claim 29 or claim 30 wherein said VLIW-instruction contains said instruction number rewrite instruction in one of said plurality of instruction sets that is to be executed second to last.

34. A variable word length VLIW-instruction processor according to claim 33, wherein
    said instruction control unit includes an instruction fetch pipeline control means;
    said instruction fetch pipeline control means based on a location of one of said plurality of instruction sets that contains said instruction number rewrite instruction, inhibits an instruction that is to be executed first in a subsequent VLIW-instruction from being fetched.

35. A variable word length VLIW-instruction processor according to claim 29 or claim 30 wherein said VLIW-instruction contains said instruction number rewrite instruction in one of said plurality of instruction sets that is to be executed third to last.

36. A variable word length VLIW-instruction processor according to claim 35, wherein
    said instruction control unit includes an instruction fetch pipeline control means;
    said instruction fetch pipeline control means based on a location of one of said plurality of instruction sets that contains said instruction number rewrite instruction, inhibits an instruction that is to be executed first in a subsequent VLIW-instruction from being fetched.

37. A variable word length VLIW-instruction processor according to claim 29 or claim 30 wherein some VLIW-instruction contains a branch instruction in one of said plurality of instruction sets that is to be executed last.

38. A variable word length VLIW-instruction processor according to claim 37, wherein said instruction control unit includes an execution pipeline control means and write pipeline control means for cancelling, based on a location of one of said plurality of instruction sets that contains said branch instruction, execution of an instruction of a subsequent VLIW-instruction that is to be executed first in said subsequent VLIW-instruction.

39. A variable word length VLIW-instruction processor according to claim 38, said instruction control unit further including a branch-destination address hold register for storing a branch-destination address for said branch instruction contained in said VLIW-instruction.

40. A variable word length VLIW-instruction processor according to claim 29 or claim 30 wherein some VLIW-instruction contains a branch instruction in one of said plurality of instruction sets that is to be executed second to last.

41. A variable word length VLIW-instruction processor according to claim 40, wherein said instruction control unit includes an execution pipeline control means and write pipeline control means for cancelling, based on a location of one of said plurality of instruction sets that contains said branch instruction, execution of an instruction of a subsequent VLIW-instruction that is to be executed first in said subsequent VLIW-instruction.

42. A variable word length VLIW-instruction processor according to claim 41, said instruction control unit further including a branch-destination address hold register for storing a branch-destination address for said branch instruction contained in said VLIW-instruction.

43. A variable word length VLIW-instruction processor according to claim 29 or claim 30 wherein some VLIW-instruction contains a branch instruction in one of said plurality of instruction sets that is to be executed third to last.

44. A variable word length VLIW-instruction processor according to claim 43, wherein said instruction control unit includes an execution pipeline control means and write pipeline control means for cancelling, based on a location of one of said plurality of instruction sets that contains said branch instruction, execution of an instruction of a subsequent VLIW-instruction that is to be executed first in said subsequent VLIW-instruction.

45. A variable word length VLIW-instruction processor according to claim 44, said instruction control unit further including a branch-destination address hold register for storing a branch-destination address for said branch instruction contained in said VLIW-instruction.

46. A variable word length VLIW-instruction processor according to claim 25 wherein said instruction number that is stored in said instruction number register is initialized upon power-on or system-reset.

47. A variable word length VLIW-instruction processor according to claim 25 wherein, upon running an object program for a processor that executes a VLIW-instruction which is identical in instruction format with said VLIW-instruction and which is different in the number of execution units from said VLIW-instruction, said instruction number stored in said instruction number register is rewritten based on said instruction number rewrite instruction contained in said VLIW-instruction that is executed one instruction ahead of a leading part of said object program.

48. A variable word length VLIW-instruction processors, comprising:

a plurality of execution units for executing instructions;

an instruction number register for storing a number of instructions included in a VLIW-instruction; and an instruction control unit for controlling instruction execution performed by each of said plurality of execution units, said instruction control unit including:

a division means, that receives a VLIW-instruction composed of a plurality of instructions including an instruction number rewrite instruction, for rewriting the number of instructions stored in said instruction number register in accordance with said instruction number rewriting instruction and for performing a division operation of the rewritten number of instructions as a dividend and the number of said execution units as a divisor, to find a quotient and a reminder;

an instruction control means; wherein when said quotient is not zero, said instruction control means controls said plurality of execution units to perform parallel execution of a number of instructions equal to the number of said plurality of execution units, a number of times equivalent to said quotient;

when said remainder is not zero, said instruction control means controls a number of said plurality of execution units equal to said remainder, to perform parallel instruction execution;

when said quotient is zero, said instruction control means controls a number of said plurality of execution units equal to said remainder, to perform parallel instruction execution; and wherein, a plurality of instructions forming a single VLIW-instruction are divided into a plurality of instruction sets for controlling parallel execution of said instruction sets.

49. A variable word length VLIW-instruction processor according to claim 48, further comprising:

a plurality of execution units for executing instructions; and a branch-destination address hold register for holding a branch-destination address for a branch instruction contained in said VLIW-instruction.

* * * * *

UNITED STATES PATENT AND TRADEMARK OFFICE
CERTIFICATE OF CORRECTION

PATENT NO. : 5,774,737
DATED : June 30, 1998
INVENTORS : Nakano

It is certified that error appears in the above-identified patent and that said Letter Patent is hereby corrected as shown below:

In the Claims:

Claim 30, line 7, change "reminder" to --remainder--.

Claim 48, line 18, change "reminder" to --remainder--.

Signed and Sealed this

Ninth Day of May, 2000

Q. TODD DICKINSON

*Attest:*

*Attesting Officer*           *Director of Patents and Trademarks*